United States Patent [19]
Zee

[11] Patent Number: 4,530,049
[45] Date of Patent: Jul. 16, 1985

[54] STACK CACHE WITH FIXED SIZE STACK FRAMES

[75] Inventor: Benjamin Zee, Glen Ellyn, Ill.

[73] Assignee: AT&T Bell Laboratories, Murray Hill, N.J.

[21] Appl. No.: 347,894

[22] Filed: Feb. 11, 1982

[51] Int. Cl.³ .............................................. G06F 9/40
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,153,225 | 4/1961 | Merner et al. | 364/200 |
| 3,461,434 | 8/1969 | Barton et al. | 364/200 |
| 3,548,384 | 12/1970 | Barton et al. | 364/200 |
| 3,568,158 | 3/1971 | Haller | 364/200 |
| 3,629,857 | 12/1971 | Faber | 364/200 |
| 3,725,876 | 4/1973 | Hauck | 364/200 |
| 3,781,810 | 12/1973 | Downing | 364/200 |
| 3,786,432 | 1/1974 | Woods | 364/200 |
| 3,810,117 | 5/1974 | Healey | 364/200 |
| 3,868,644 | 2/1975 | Healey et al. | 364/200 |
| 3,889,243 | 6/1975 | Drimak | 364/200 |
| 3,909,794 | 9/1975 | Soltsien | 364/200 |
| 3,909,797 | 9/1975 | Goss et al. | 364/200 |
| 4,217,638 | 8/1980 | Namimoto et al. | 364/200 |
| 4,241,399 | 12/1980 | Strecker et al. | 364/200 |
| 4,296,470 | 10/1981 | Fairchild et al. | 364/200 |

OTHER PUBLICATIONS

R. Bernhard, "More Hardware Means Less Software", IEEE Spectrum, Dec. 1981, pp. 30-37.
G. D. Kraft and W. N. Toy, "Mini/Microcomputer Hardware Design", (1979), pp. 191-208, 285-286.
R. B. Dannenberg, "An Architecture with Many Oper-
and Registers ... ", Conference Proceedings of the 6th Annual Symposium on Computer Architecture, Apr. 23-25, 1979, pp. 50-57.
W. D. Strecker, "Cache Memories for PDP-11 Family Computers," Conference Proceedings of the 3rd Annual Symposium on Computer Architecture, Jan. 19-21, 1976, pp. 155-158.

*Primary Examiner*—Thomas M. Heckler
*Attorney, Agent, or Firm*—David Volejnicek

[57] ABSTRACT

In a programmable system (10) which includes a processor (11) for executing a program structured from a plurality of subprograms, and a stack cache memory (16) for storing subprogram linkage information, the stack (41) is comprised of frames (40) of equal size. Each frame (40) stores the information linking a subprogram to the immediately preceding subprogram. A set of general registers (44) is implemented in each frame (40). Preferably each frame (40) is comprised of a plurality of blocks (42-45) of an equal number of cache memory words (46). The set of general registers (44) occupies one block (44) of the frame (40).

Addressing of individual words (46) in a frame (40) is accomplished via concatenation of a frame pointer (18, 19, 32) a block selector (51, 33), and a word selector (52, 34). Preferably a second memory (12), such as a portion of a main memory, is also included in the system (10) and stores linkage information, such as overflow linkage information. For purposes of communicating with the second memory (12), the cache memory (16) is organized as a buffer.

38 Claims, 8 Drawing Figures

SBAG 30

STACK CACHE WITH FIXED SIZE STACK FRAMES

TECHNICAL FIELD

This invention relates to programmable systems, and in particular, to the linkage of successive subprograms in structured programs in such systems.

BACKGROUND OF THE INVENTION

In structured programming, transitions of program execution to a called program, and returns to the execution of the calling program—such as occur on subroutine calls and returns—require the storing and restoration of information linking the called program to the calling program. For purposes of this discussion, both the calling programs and the called programs will commonly be referred to as subprograms. Linking or linkage information of a subprogram herein refers to information associated with the subprogram, such as arguments or parameters, local variables, general register contents, program counter contents, the process status word, the return values calculated by a subprogram, and the like.

Modern structured programming relies heavily on the use of subprograms, and therefore the moving of linking information in and out of storage can become a major overhead in such a programming environment. Thus, to be able to implement structured programming and still obtain high system efficiency, program level linkage must be optimally implemented.

This objective is approached by utilizing a stack dedicated to storing linkage information, and implementing the stack at least in part in a cache memory. However, the stack frames, each one of which contains the items of information linking a single called program to its calling program, have not been made all of the same size, and to keep track of where each frame begins, it has been necessary to calculate and store a pointer for each frame, which pointer indicates the starting address of that frame. This bookkeeping function undesirably adds to program overhead.

Furthermore, to access an item of information within such a stack frame, the item's frame pointer offset must be added to the frame pointer to arrive at its address. The overhead of pointer offset addition incurred each time an item must be accessed can place a noticeable limitation on system performance.

An acute example of this limitation is the treatment of general registers within such systems. Many conventional systems have only one set of general registers, and at every transition of program execution from a calling to a called program the contents of the general registers must be stored to free them for use during execution of the called program; on return of program execution to the calling program, the contents of the general registers must be restored. This characteristic makes the contents of the general registers suited for inclusion in the linkage information stored in a stack. Due to the overhead associated with indirect, offset addition, addressing of stack information, however, system performance is markedly limited by the storage and retrieval of general register contents.

An alternative prior art scheme directly implements general registers in a separate cache memory, which is organized as a stack but which is dedicated to general registers. A separate set of general registers is associated with each subprogram. This scheme avoids the overhead of general register saves and restores. But it requires a controller to interleave its activities, working alternatively with the linkage information stack and the general register stack, and to work with two sets of pointers, one for the linkage information stack and another for the general register stack. This adds much complexity to the system and again places a significant limitation on system performance.

SUMMARY OF THE INVENTION

This invention is directed to solving these and other disadvantages of prior stack cache memory schemes for storing subprogram linkage information.

According to this invention, a programmable system includes a stack cache memory dedicated to linkage information storage and comprising a plurality of frames of equal size, wherein each frame is adapted to store at least some of the information linking a subprogram to the preceding subprogram, and wherein each frame includes one of a plurality of sets of general registers. The system further includes an arrangement for storing frame overflow information.

Preferably, the system of this invention further includes a second memory for storing stack overflow information and adapted to communicate with the cache memory, while the cache memory is organized as a buffer for communicating with the second memory. Additionally, the stack cache memory and the second memory may communicate asynchronously with the operation of the system's processor while the processor is not communicating with the cache memory.

Advantageously, the invention eliminates the overhead associated with the storage and restoration of the contents of general registers at each subprogram transition, thereby improving system performance.

Address of any location within the frame can be determined by a process of concatenation, which involves substantially less overhead than the conventional method of addressing via addition; hence the present invention increases the speed of access of a frame location and thereby improves the performance of the programmable system.

Not only can the general registers be accessed as rapidly as in the conventional systems, without the need to incur overhead in storing and retrieving the general register contents during subprogram calls and returns, but the other items of information in the stack frame can now be accessed with the same speed previously enjoyed only by the general registers.

Furthermore, this invention does not produce a duplication of general register hardware, for no general registers duplicative of those implemented in the stack cache are needed.

Additionally, system complexity is reduced and system performance is improved because a separate general register stack is not used.

It also becomes unnecessary to keep track of the size of a frame in order to determine the address of the starting location, or frame pointer, of a frame. The invention makes it possible to store information in, or retrieve information from, a predetermined location of a frame other than the currently used frame.

The second memory provides the system with the capability to handle overflow of linkage information, either when the size or amount of linkage information exceeds the storage capability of the stack frame, or when the required number of stack frames exceeds the size of the stack cache memory. Thus the system of the present invention achieves almost universal versatility, in the sense that substantially the size of the stack cache memory does not place a limitation either on the amount or the size of items of linkage information that a subprogram transition may generate, or on the number of nested subprograms that a program may have.

Furthermore, asynchronous inter-memory communications outside of processor accesses of the cache memory are transparent in real time, so that the system generally incurs very little overhead in updating the second memory with cache memory contents and in restoring stack information from the second memory to the stack cache memory.

These and other advantages of the invention will become apparent during the following description of an illustrative embodiment of the invention, taken together with the drawing.

DETAILED DESCRIPTION

Figure 1:
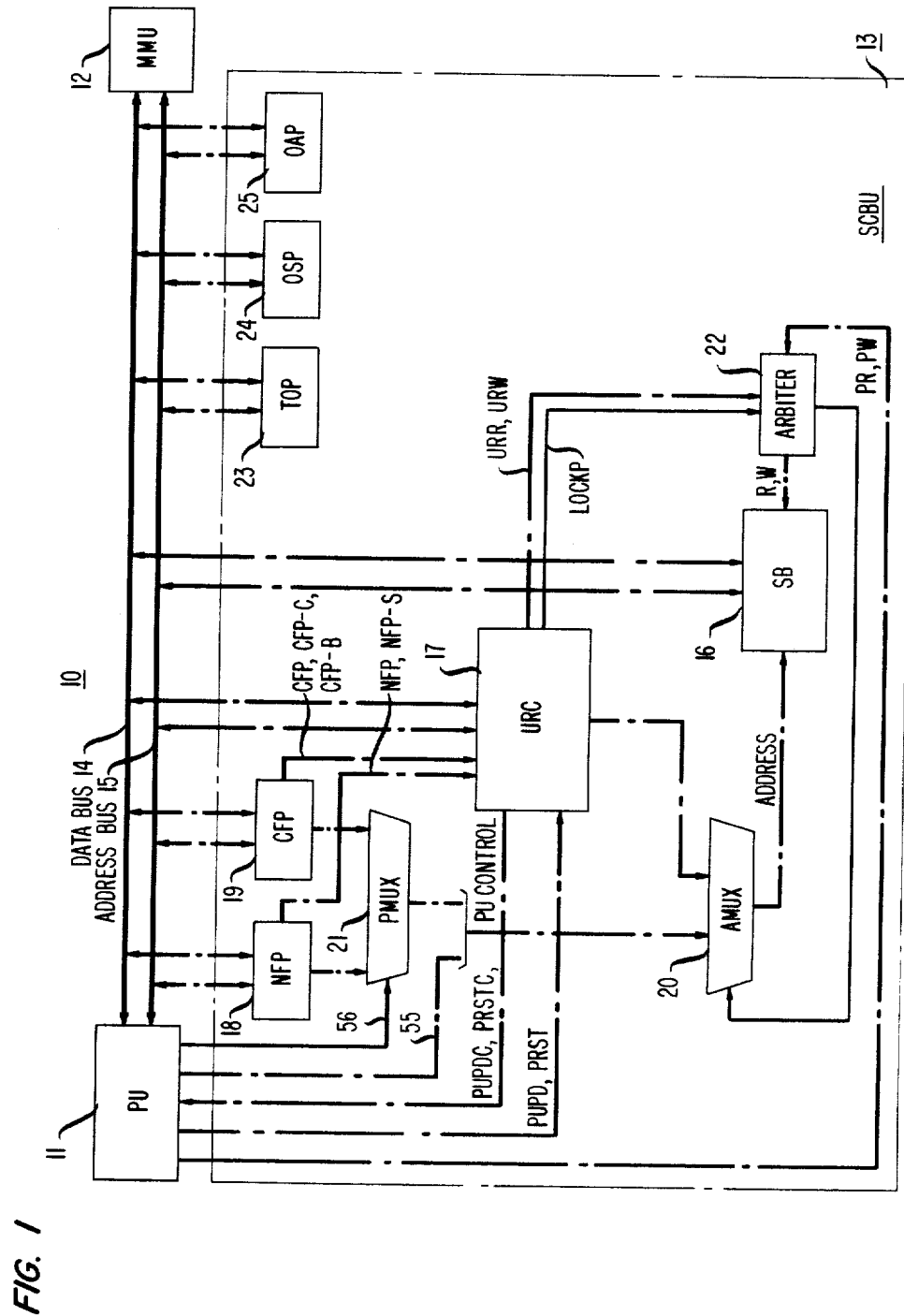
FIG. 1 is a block diagram of a programmable system embodying an illustrative example of the invention, and also shows a block diagram of the configuration of the stack cache buffer unit of the system.

By way of further background, hierarchical modular structuring of computer software such as is followed in modern structured programming decomposes complex programs into a plurality of processes, and further decomposes the processes into a plurality of functions, also referred to as procedures or subroutines. These subdivisions of a program are generally referred to as subprograms.

As the treatment of functions and processes within a job thread is the same for purposes of this discussion, a general reference to function calls and returns will be made with the understanding that it refers to all types of subprograms and their calls or invocations and returns. During program execution, the processes and functions generally follow an order of execution which corresponds to the order in which they were called. The ordering thus comprises a plurality of subprograms arranged according to their calling sequence. Accordingly, the first function—the overall calling function—of an initial process will occupy the first position in the ordering, functions directly called by the first position function will occupy the second position in the ordering, functions directly called by the second position functions will occupy the third position, and so on.

A function can be called more than once and a function can generally call itself: therefore a function can appear more than once in the same and in different positions in the ordering. A function of the process may also invoke a second process, whose functions will then occupy positions in the ordering which are subsequent to that of the function which invoked that second process; the second process may invoke a third process, and so on.

The assignment of functions to their respective positions in the ordering is generally done at run time.

The above-described ordering occurs within a single job thread, or context, during program execution, in that the various subprograms are returned to in reverse order from that in which they were called. Thus, when an execution function makes a call to another function, execution of the calling function stops and passes to the called function. Execution returns to the calling function only after the called function and functions in turn called by that called function have been executed to completion.

Similarly on the process level, an executing process may invoke another process, generally one of a higher priority. The executing process ceases execution and execution passes to the invoked process. The execution of the invoking process does not resume until the invoked process, and processes in turn invoked by that process, which are generally processes of still higher priority, have been executed to completion.

During program execution, however, an interrupt or a trap may occur which breaks the job thread and causes a context switch to another job thread. On such an interrupt or trap, the execution of a function or process is terminated and passes to another process which does not have the above-described ordered relationship with respect to the interrupted function or process. The job thread is broken because returns of program execution from interrupting processes need not necessarily follow a last-interrupted, first-returned-to-order. Rather, the occurrence and assigned order of context switches is generally a real-time function of the operating system.

The above description of the decomposition and manner of execution of a program provides a context for the following discussion of an illustrative embodiment of the present invention.

For executing a structured program in the manner just described, there is provided a programmable system 10, shown in FIG. 1. The system 10 generally comprises a conventional processing unit (PU) 11, a conventional main memory unit (MMU) 12, and a stack cache buffer unit (SCBU) 13. The three units 11-13 are interconnected by a data bus 14 and an address bus 15, both of which are 32 bits wide in this embodiment.

Program instructions and data are stored in the MMU 12. The PU 11 accesses the instructions and operands in the MMU 12 over the address bus 15 and retrieves them over the data bus 14. The PU 11 executes the program instructions, accesses the operands, and returns results to the MMU 12 over the data bus 14 for storage in memory locations designated over the address bus 15.

The SCBU 13 is a high-speed intermediate memory unit which is utilized by the PU 11 for storage of linking information. The storage element of the SCBU 13 is a stack buffer (SB) 16 which in this embodiment is a conventional static random access memory (RAM). For purposes of this illustration, the RAM is chosen to be 512 memory words deep and 32 bits wide.

The SCBU 13 is dedicated to linkage information storage, and at any one time it stores the linkage information of a single job thread. On a context switch the linking information stored in the SB 16 is transferred, or updated, to the MMU 12 for storage, and the SCBU 13 is reinitialized for use by the succeeding job thread. The linkage information stored in the MMU 12 is reloaded, or restored, into the SB 16 on a context switch back to the interrupted job thread.

When the amount of linkage information generated by repeated successive function calls in a job thread exceeds the storage capacity of the SB 16, the stack 41 overflow linkage data is transferred to a stack in the MMU 12 for storage. If the linkage information of a single function call exceeds a predetermined amount or is of a predetermined type, this linkage information, referred to as frame overflow, is likewise stored in a stack in the MMU 12.

Figure 7:
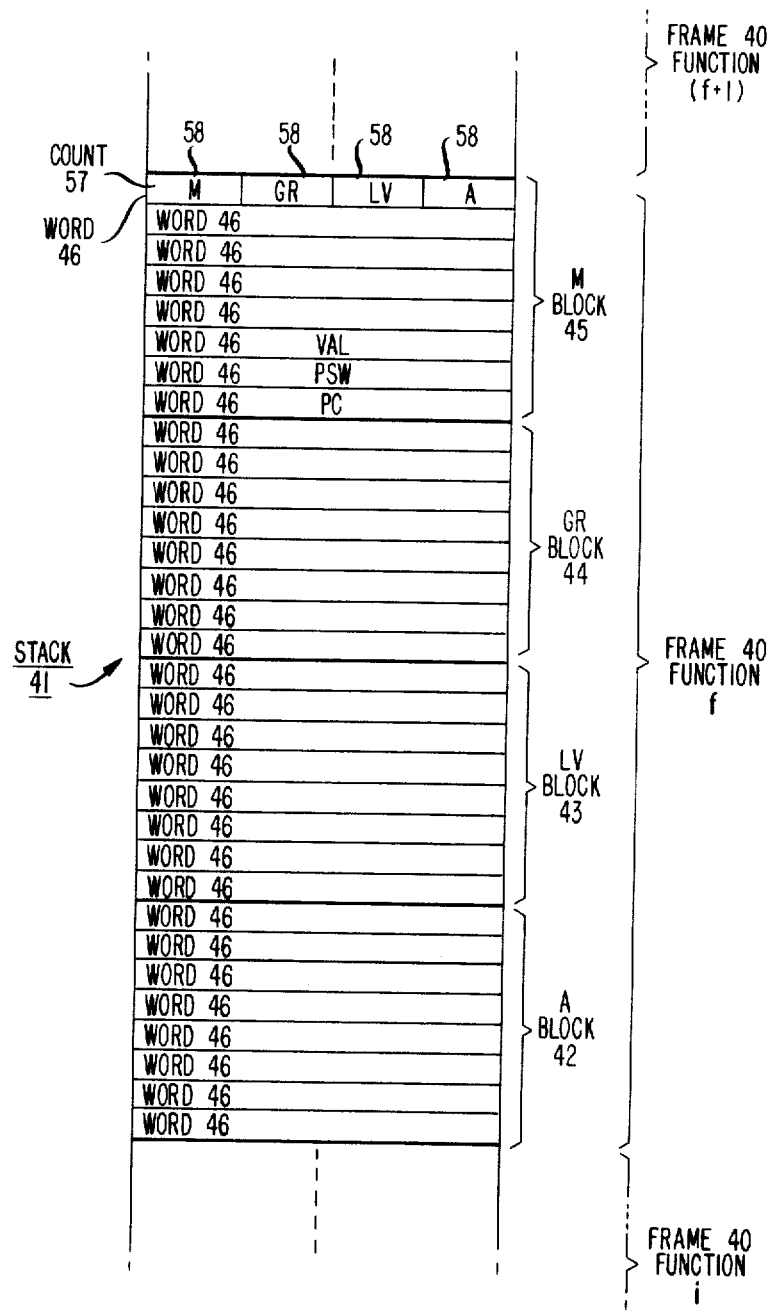
FIG. 7 is a functional organization diagram of the stack buffer of the stack cache buffer unit of FIG. 1.

The organization of the SB 16 is shown in FIG. 7. From the viewpoint of the PU 11, the SB 16 is organized as a stack 41. The stack 41 comprises a plurality of successive contiguous sets of storage locations, referred to as frames 40. Each frame 40 is treated as a single entry of the stack 41. Linkage information of successive subprograms is stored in successive frames 40. On the occurrence of a function call, a frame 40 of new linkage information is added to, or pushed onto, the top of the stack 41. Thus the frame 40 of a function f which has been called by a function i lies directly above the frame 40 of the function i, and the frame 40 of a function (f+1) that that has been called by the function f lies immediately above the frame 40 of the function f, as shown in FIG. 7. On the occurrence of a function return, the top frame 40 of linkage information is removed from, or popped off of, the top of the stack 41. Thus the frames 40 are generally popped in reverse order from that in which they were pushed, i.e., on a last-in, first out basis, and once a frame 40 containing the linkage information of a function has been utilized to bring to completion the execution of that function, that frame 40 is freed and made available for storage of linking information on the next function call.

From the viewpoint of the MMU 12, the SB 16 is organized as a buffer. During updates into the MMU 12 of the information stored in the SB 16, frames 40 are updated in the same order in which they were filled with linkage information. Hence, data transfers from the SB 16 to the MMU 12 occur on a first-in, first-out basis. On the other hand, during restores into the SB 16 of information stored in the MMU 12, the frames 40 are restored in reverse order from that in which they were updated into the MMU 12.

The size and organization of the frames 40 is dictated by the type and amount of linkage information that must be stored therein on a function call.

Linkage information typically includes four types of data items: local variables, parameters or arguments, general register contents, and miscellaneous process information such as the program counter and the process status word. Accordingly, each frame 40 is divided into four blocks 42-45, with each block 42-45 dedicated to storing one type of data items. As shown in FIG. 7, the first block 42 is assigned to hold the arguments, the second block 43 is assigned to hold the local variables, the third block 44 is assigned to the general registers, and the fourth block 45 is assigned to hold the miscellaneous process information.

A well-structured program in general should be broken down into small enough functions so that the number of arguments and local variables used in each is usually either or fewer. Experience also indicates that conventional systems generally find eight or fewer general registers adequate for the execution of a function. Therefore each block 42-45 of a frame 40 is comprised of eight memory words 46. As a result, each frame 40 comprises thirty two memory words 46, and all of the frames 40 are of the same fixed size. In the present example where the SB 16 is a 512-word RAM, the SB 16 holds sixteen frames 40.

While the choice of eight memory words 46 per block 42-45 is a reasonable choice, it is not the only choice possible; rather, the blocks 42-45 can be of any desired size.

While each block 42-45 in this example has eight memory words 46, the number of items of linkage information stored in each block may be less than eight. To avoid updating empty words 46 into the MMU 12, there is stored in the last word 46 of the miscellaneous block 45 of each frame 40 a count 57 of the number of items of information stored, i.e., the number of full data words 46, in each block 42-45 of that frame 40.

The frame count 57 of the current function is generated by the compiler (not shown), which is a program that translates high level language statements into machine level instructions. In the present example, the frame count 57 includes the number of data words stored in each block 42-45 of the frame 40 associated with a function. The count 57 is a single data word 46 divided into four fields each of which holds the count 58 of the associated block 42-45. Because each block 42-45 has eight words 46, a block count 58 cannot exceed eight.

Returning now to FIG. 1, to keep track of which frame 40 of the SB 16 is currently being utilized, i.e., which frame 40 is assigned to hold linkage information of the presently-executing subprogram, the SCBU 13 includes a current frame pointer (CFP) 19. The CFP 19 has a four bit register which holds the SB 16 address of the current frame 40. The CFP 19 is loaded when a job thread is activated; thereafter, it is incremented every time a function is called and is decremented every time a function is returned to. In that it always points to the last valid stack entry, or frame 40, the CFP 19 functions as a stack 41 pointer.

For facilitating the return to a calling function of a value calculated by a called function and stored in a word 46 of that function's frame 40, the SCBU 13 utilizes a next frame pointer (NFP) 18. The NFP 18 is also utilized by a calling function to load the block 42 of a called function's frame 40 with arguments. The NFP 18 is four-bit register which addresses the frame 40 immediately above the frame 40 addressed by the CFP 19.

The NFP 18 and the CFP 19 can be read out and written into by the PU 11 over the data bus 14. Data transfers to and from the SCBU 13 are also made over the data bus 14.

Because the SB 16 of this example has 512 memory words 46, addressing of the SB 16 requires a 9 bit address. Addressing of the SB 16, for purposes of storing therein and retrieving therefrom linkage information on function calls and returns, is done by the PU 11 in conjunction with the NFP 18 and the CFP 19. The addressing is done in the following manner.

Figure 8:
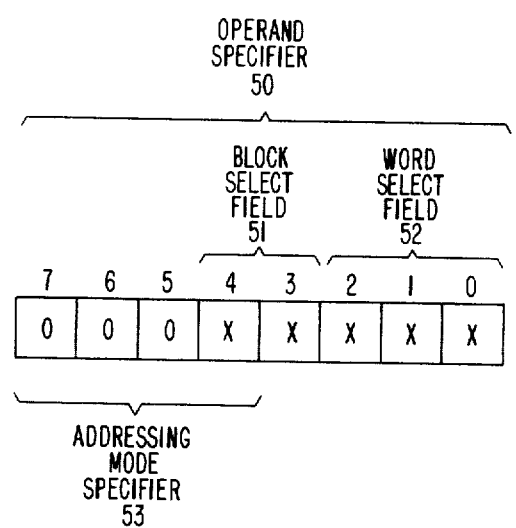
FIG. 8 is a functional diagram of an operand specifier of an instruction word of the programmable system of FIG. 1.

Machine code, or like level program instructions, include an operand specifier which may specify that an operand is stored in a certain frame word 46 in the SB 16. An illustrative embodiment of such an operand specifier 50 is shown in FIG. 8. The operand specifier 50 is 8 bits long, and forms eight bits, designated by the numerals 0-7, of an instruction word. The four most significant bits 7-4 of the operand specifier 50 form the addressing mode specifier 53, which specifies the storage unit that is being addressed as well as the mode of access, such as direct or indirect addressing, indexing, etc. In this example, a mode specifier 53 of 0000 or 0001 indicates that the SCBU 13 is being addressed. The bits 4-3 of the operand specifier 50 form a block select field 51 which specifies the block 42-45 which is being addressed, and the three least significant bits 2-0 of the operand specifier 50 form a word select field 52 which specifies the particular word 46 of the selected block 42-45 which it is desired to access.

The frame 40 to which the block select field 51 and the word select field 52 pertain is specified by either the CFP 19 or the NFP 18.

When the PU 11 decodes a program instruction and finds the addressing mode specifier 53 denoting the SCBU 13, it sends the five bits of the block select field 51 and the word select field 52 over an address link 55 to the SCBU 13 for concatenation with the four bits of either the CFP 19 or the NFP 18 to form a 9 bit SB 16 address, as shown in FIG. 1. Thus, through simple concatenation, the PU 11 can access any word 46 of the SB 16 without need for address translation or pointer offset addition.

The PU 11 selects the CFP 19 or the NFP 18 via a pointer multiplexer (PMUX) 21 which it controls over a PMUX control lead 56. Generally, the PU 11 selects the CFP 19: only while filling the argument block 42 of the frame 40 of a called function or while returning to a calling function a value calculated by the called function does the PU 11 select the NFP 18.

Addressing of the SB 16, for purposes of updating the contents of the SB 16 into the MMU 12 and restoring the contents of the SB 16 from the MMU 12, is done by an update and restore controller (URC) 17 of the SCBU 13. The URC 17 controls transfers of data between the SCBU 13 and the MMU 12, and for this purpose it generates a 9-bit address for addressing the SB 16 and a 32-bit address for addressing the MMU 12. The URC 17 operates asynchronously with the PU 11. The URC 17 addresses the MMU 12 over the address bus 15. The URC 17 initiates updates and restores on its own in response to conditions such as overflow or wraparound of the SB 16; for this purpose the URC 17 also monitors the status of the NFP 18 and the CFP 19. The URC 17 also responds to update and restore requests from the PU 11, which occur, for example, on context switches.

The selection of the addressing source—either the address link 55 plus pointer 18 or 19, or the URC 17—is made by an address multiplexer (AMUX) 20. The AMUX is controlled by an arbiter 22, which may be any well-known arbiter circuit.

The arbiter 22 resolves conflicts that arise if and when both the PU 11 and the URC 17 attempt to access the SB 16 simultaneously. The arbiter 22 receives control signals PR, PW from the PU 11 and controls signals URR, URW from the URC 17 advising it of their desire to access the SB 16, and in response it generates control signals R, W necessary to read and write the SB 16, respectively, and signals to control the AMUX 20. Generally, the arbiter 22 gives priority to accesses of the SB 16 being made by the PU 11 and hence updates and restores generally can proceed only when the PU 11 is not communicating with the SB 16. However, under certain conditions, specified later on in this discussion, the arbiter 22 is caused by a LOCKP signal from the URC 17 to give preference to SB 16 accesses being made by the URC 17 and to lock the PU 11 out of the SB 16.

The SCBU 13 also includes three registers, each thirty-two bits wide in this embodiment, which are used for addressing of frame overflow linkage information that may be stored in the MMU 12: a TOP pointer 23, an OSP pointer 24, and an OAP pointer 25. The pointers 23-25 are tied to the address bus 15 for addressing the MMU 12. They can also be loaded or read out over the data bus 14. The function of the pointers 23-25 is discussed in detail later on.

Figure 2:
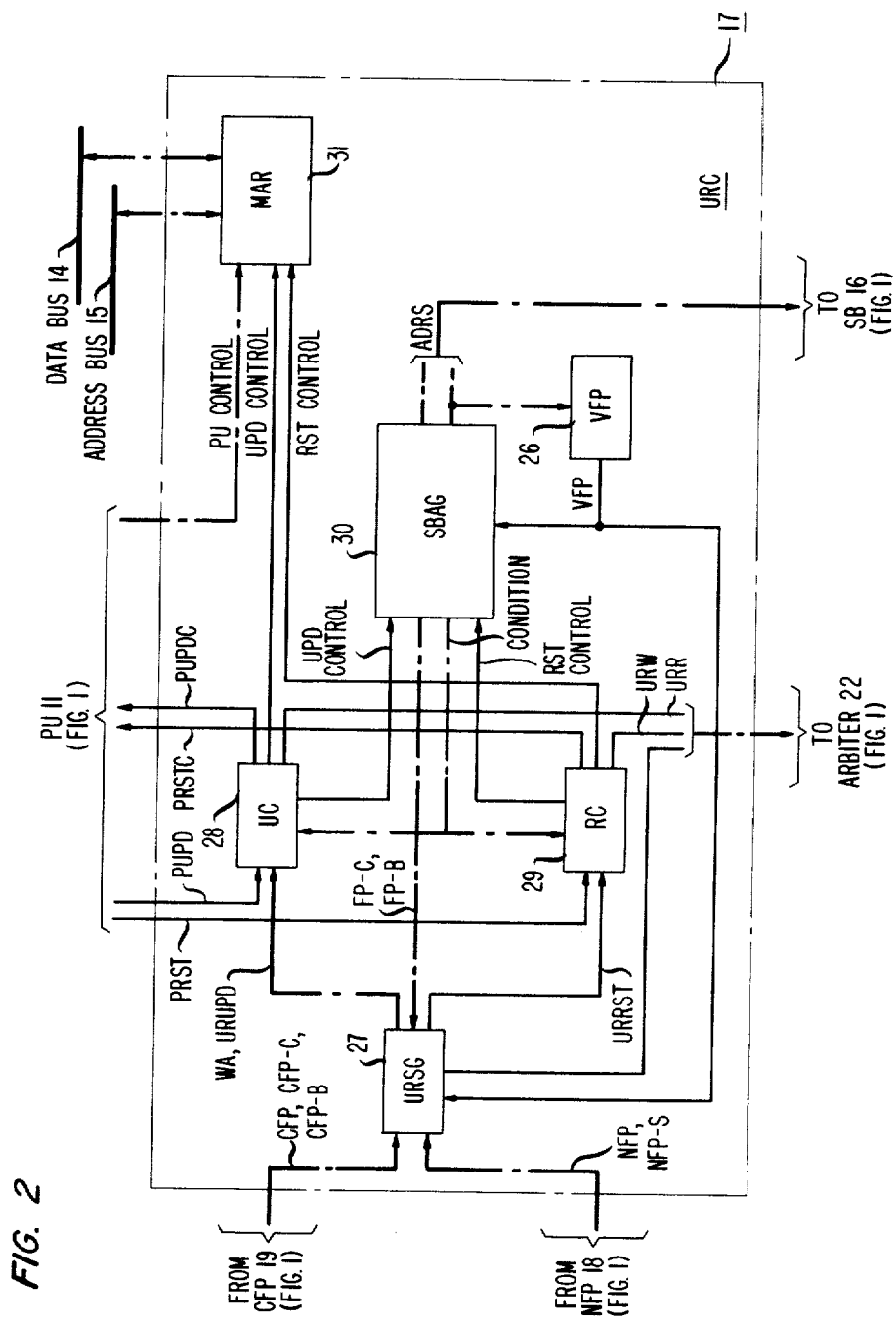
FIG. 2 is a block diagram of the update and restore controller of the stack cache buffer unit of FIG. 1.

FIG. 2 shows the internal structure of the update and restore controller (URC) 17 of FIG. 1. The URC 17 includes a valid frame pointer (VFP) 26, which is a register containing the address of the last, lowest, frame 40 of valid, not updated, information in the stack 41. Frame 40 lying below the last valid frame 40 will generally have been invalidated by being overwritten, either on wraparound of the stack 41 or on a context switch.

An update and restore signal generator (URSG) 27 monitors the status of the VFP 26, the NFP 18, the CFP 18, and a frame pointer (FP) 32 of the SBAG 30 (see FIG. 6); in response it generates requests (URUPD) to an update controller (UC) 28 to update the MMU 12 with information from the SB 16, generates requests (URRST) to a restore controller (RC) 29 to restore to the SB 16 information that has been updated into the MMU 12, and selectively locks out the PU 11 from accessing the SB 16 by sending a lock signal (LOCKP) to the arbiter 22.

The UC 28 and the RC 29 also receive update requests (PUPD) and restore requests (PRST) from the PU 11. The UC 28 and the RC 29 are sequencers. Upon receiving an update or a restore request, the UC 28 or RC 29, respectively, generates a sequence of control signals to a stack buffer address generator (SBAG) 30, and to a memory address register (MAR) 31, and in conjunction with them performs the update or restore operations. At the completion of an update or restore operation initiated by the PU 11, the UC 28 or RC 29 returns a response signal PUPDC or PRSTC, respectively, to the PU 11 to advise it thereof.

The SBAG 30 responds to the control signals from the controllers 28, 29 to generate addresses to the SB 16. The most significant 4 bits of these 9-bit addresses are also selectively utilized to load the VFP 26. The SBAG 30 further generates condition signals—comparisons—which it feeds back to the URSG 27, the UC 28, and the RC 29 to keep them advised of the point to which updating or restoration has progressed.

The MAR 31 is a register which holds the address of a location in the MMU 12 which holds the last item of stack 41 information updated and hence the first item of information to be restored. The MAR 31 addresses the MMU 12 over the address bus 15. Aside from being controlled by the UC 28 and RC 29, the MAR 31 can be loaded or read by the PU 11 over the data bus 14.

Figure 3:
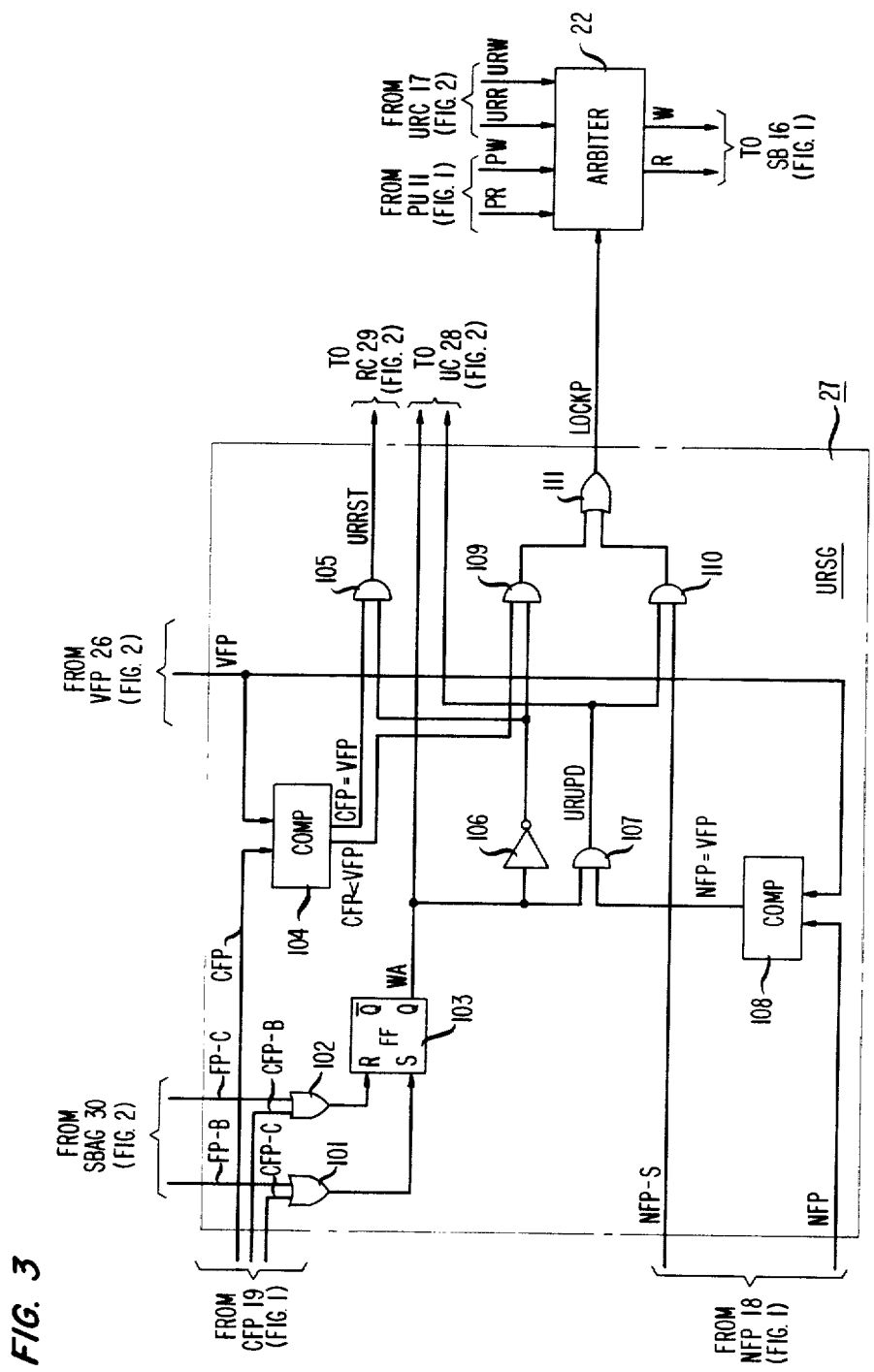
FIG. 3 is a logic diagram of the update and restore signal generator of the update and restore controller of FIG. 2.

FIG. 3 shows a logic diagram of the update and restore signal generator (URSG) 27 of FIG. 2. The URSG 27 implements stack cache miss predict and prefetch, and wraparound, as explained below. The URSG 27 anticipates requirements for update and restore operations, necessitated by SB 16 wraparounds and by context switches, and initiates these operations. It also prevents the destruction of valid SB 16 data or the use of invalid SB 16 data.

The operational environment of the URSG 27 is as follows. Wraparound allows the effective size of the stack 41 to be increased beyond the physical size of the SB 16, by treating the SB 16 as a circular memory. When all of the frames 40 of the SB 16 are filled with data, a function call causes the SB 16 to overflow. Wraparound treats the bottom frame 40 of the SB 16 as the next highest frame 40 of the stack 41 and stores the linkage data generated by that last function call in the bottom frame 40 of the SB 16. Similarly, wraparound treats the other successive frames 40 of the SB 16 as the successively higher frames 40 of the stack 41, and thus reuses the SB 16 to extend the stack 41 beyond the storage capacity of the SB 16.

Of course, when the original data in the SB 16 is overwritten with new data on wraparound, the original data is destroyed. To prevent the loss of this data, before a frame 40 of data is overwritten on wraparound it must be updated into the MMU 12.

As function returns pop frames 40 off of the top of the stack 41, the stack 41 top eventually wraps back and reaches a point in the SB 16 below which frames 40 of the original data have been destroyed on wraparound. These frames 40 of original data must then be restored to the SB 16 before further pops of stack 41 data from the SB 16 can occur.

A context switch produces somewhat similar conditions to those of the wraparound. On a context switch the SB 16 contents are updated into the MMU 12 and the SB 16 is utilized to build the stack 41 of the new job thread. Hence, the data of the old thread is destroyed in the SB 16, and that data must be restored to the SB 16 when a context switch back to the old thread occurs.

The old thread can resume execution when the top frame 40 of its stack 41 is restored to the SB 16. But when successive function returns in the resumed process drop the top of the stack 41 below the last-restored frame 40, the process must await the restoration of further frames 40 of the stack 41 into the SB 16 before attempting further pops off of the stack 41.

The URSG 27 operates in the above-described context and its operation is as follows. A wraparound (WA) is detected and flagged by the URSG 27 when either the CFP 19 generates a carry (CFP-C) while it is being incremented during function calls, or when the FP 32 (see FIG. 6) of the SBAG 30 generates a borrow (FP-B) during restoration of information from the MMU 12 to the SB 16. The WA flag is reset when the CFP 19 generates a borrow (CFP-B) while it is being decremented during function returns or when the FP 32 generates a carry (FP-C) while it is being incremented during updating of information from the SB 16 to the MMU 12.

Generation of a carry indicates that the pointer in question has been incremented through the top frame 40 of the SB 16 and has reset to point to the bottom frame 40 again. Generation of a borrow indicates that the pointer has been decremented through the bottom frame 40 of the SB 16 and has reset to point to the top frame 40 again. Thus the WA flag is reset when the CFP 19 and the FP 32 are on the same wrap, but sets when the CFP 19 and the FP 32 are on different wraps.

The VFP 26 changes as a result of an update or a restore operation, but during the operation, the FP 32 acts as a temporary, dynamic, valid frame pointer. Hence the WA flag of the URSG 27 is effectively keeping track of whether or not the CFP 19 and the VFP are on the same or different wraps.

If a WA is indicated, there is the danger of the top of the stack 41, i.e., the CFP 19, overtaking the VFP 26 from below and destroying valid data lying above the VFP 26. The URSG 27 must check for and prevent this situation from occurring. Also, as the CFP 19 closely approaches the VFP 26 from below, there is a likelihood that on the occurrence of further function calls the PU 11 will have to wait for an update operation to be performed before being allowed to push data onto the stack 41. The URSG 27 must anticipate this situation and preferably avoid its occurrence.

Hence, when a WA is indicated and the NFP 18 points to the same stack 41 address as the VFP 26, indicating that the CFP 19 is in the immediate lower vicinity of—only one frame 40 behind—the VFP 26, the URSG 27 sends an update signal URUPD to the UC 28 to cause it to move the VFP 26 higher up the stack before the CFP 19 catches up with it. If a function call, resulting in a push operation (NFP-S), occurs while a WA is indicated and the NFP points to the same stack address as the VFP 26, indicating that the PU 11 is about to store new data in the frame 40 addressed by the VFP 26 and hence destroy the old data stored therein, the URSG 27 generates a LOCKP signal to the arbiter 22 to lock the PU 11 out from accessing the SB 16 while an update is performed and thereby to prevent the PU 11 from destroying valid, not updated, data in the SB 16.

If a WA is not indicated there is the danger of the top of the stack 41, i.e., the CFP 19, overtaking the VFP 26 from above, leading to the use of invalid or nonexistent data from locations lying below the VFP 26. The URSG 27 must check for and prevent this situation from occurring. Also, as the CFP 19 closely approaches or reaches the VFP 26 from above, there is a likelihood that on the occurrence of further function returns the PU 11 will have to wait for a restore operation to be performed before being allowed to pop data from the stack 41. The URSG 27 must anticipate this situation and preferably avoid its occurrence.

Hence, when a WA is not indicated and the CFP 19 points to the same stack address as the VFP 26, indicating that the CFP 19 has caught up with the VFP 26 from above, the URSG 27 sends a restore signal URUPD to the RC 29 to cause it to move the VFP 26 lower down the stack 41 before the CFP 19 overtakes it.

If the CFP 19 does overtake the VFP 26 in the above situation and the CFP 19 comes to point to an address below the VFP 26 address, serving as an indication that the PU 11 is about to retrieve a frame 40 of invalid data from the stack 41, the URSG 27 again generates a LOCKP signal to lock the PU 11 out from accessing the SB 16 while a restore is performed, thereby preventing the PU 11 from retrieving invalid data from the SB 16.

To achieve the above-described operation, the URSG 27 monitors the occurrence of a wrap with an "OR" gate 101 whose inputs are CFP-C and FP-B. The occurrence of an upwrap is monitored by an "OR" gate 102 whose inputs are CFP-B and FP-C. The output of the gate 101 sets a WA flip-flop 103, while the output of the gate 102 resets the WA flip-flop 103. The flip-flop 103 is a conventional R/S latch. The Q output of the flip-flop 103, labeled WA and indicative of the presence of a wrap, is connected to the UC 28 and also forms an input to an "AND" gate 107 and to an inverter 106.

The contents of the NFP 18 and the VFP 26 form inputs to a comparator 108. Its output is indicative of the equivalence of the NFP 18 and the VFP 26, which is the condition denoting a need for an update operation on a wraparound, as discussed above. The output of the comparator 108 forms a second input to the gate 107. Gate 107 generates a URUPD signal, which is sent to the UC 28 and also forms an input to an "AND" gate 110. The signal NFP-S forms the second input to the gate 110, whose output is tied to an OR gate 111 to generate the LOCKP signal.

The contents of the CFP 19 and the VFP 26 form inputs to a comparator 104. One output of the comparator 104 is indicative of the equivalence of the CFP 19 and the VFP 26 which is the condition denoting a need for a restore operation, as discussed above. This output of the comparator 104 forms an input to an input to an "AND" gate 105 while a second output of the comparator 104 is indicative of the VFP 26 being greater than the CFP 19 and forms an input to an "AND" gate 109. The second input to both gates 105 and 109 is the output of the inverter 106. The output of the "AND" gate 105 is the signal URRST to the RC 29, while the output of the gate 109 is tied to the OR gate 111 to generate the LOCKP signal. The output signals from the gates 109 and 110 are combined by the "OR" gate 111 onto a single LOCKP line to the arbiter 22.

Figure 4:
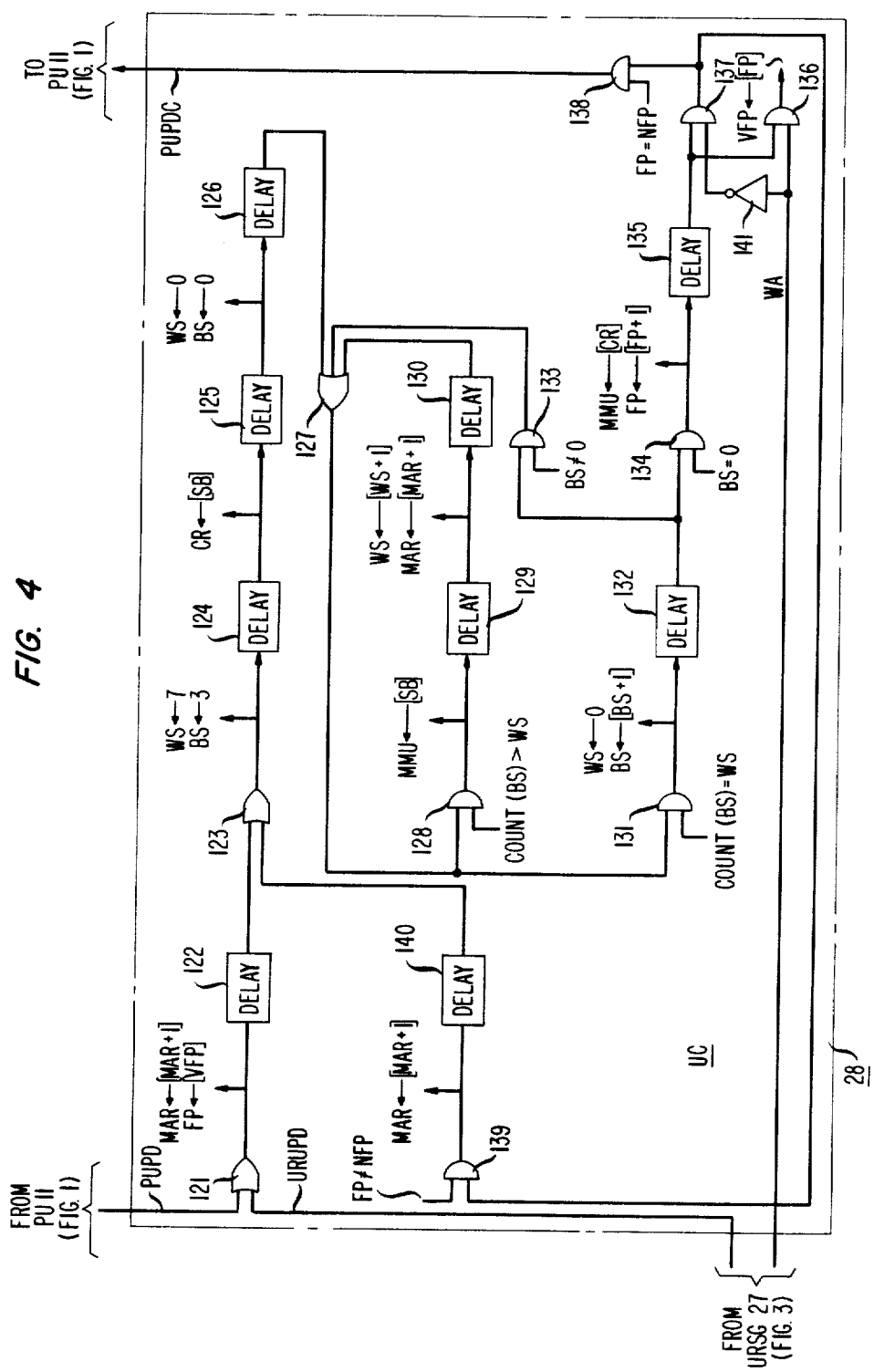
FIG. 4 is a logic diagram of the update controller of the update and restore controller of FIG. 2.

FIG. 4 shows the logical organization of the update controller (UC) 28 of FIG. 2, which updates information from the SB 16 into the MMU 12 (see FIG. 1), as described earlier. For the sake of clarity, all of the interconnections are not shown on this figure. Rather, they are suggested in functional terms for ease of understanding by those skilled in the art.

The UC 28 functions as follows: An update operation, involving the transfer of data from the SB 16 to the MMU 12, is initiated either by the PU 11 on the occurrence of a context switch, or by the URSG 27 after a wraparound has occurred and the condition that the NFP 18 equals the VFP 26 has been met. In either case the UC 28 points the MAR 31 (see FIG. 2) to the area in the MMU 12 where the next frame 40 from the SB 16 (see FIG. 7) is to be stored, retrieves from the VFP 26 the address of the first valid frame 40 at the bottom of the stack 41 in the SB 16 which is the next frame 40 to be updated into the MMU 12, accesses that frame 40 and retrieves therefrom the count 57 of items of linkage information stored in each block 42-45 of the frame 40, and according to the count 57 updates into the MMU 12 those words 46 of the frame 40 which contain information.

If the update was initiated by the URSG 27, the update operation is completed after the updating of one frame 40, and the UC 28 ends the operation by incrementing the VFP 26 to point to the new first valid, not updated, frame 40 in the SB 16.

If the update was initiated by the PU 11, the update operation continues, updating frame after frame until the last frame 40 of the current job thread, pointed to by the CFP 19, has been updated. The UC 28 ends the update operation by signaling to the PU 11 that updating has been completed, and in response, the PU 11 saves the contents of the MAR 31 into the process control block (not shown) of the interrupted process in the MMU 12.

To achieve this operation, the UC 28 monitors the PUPD and the URUPD signal lines from the PU 11 and the URSG 27, respectively, with an "OR" gate 121 to whose inputs the two lines are connected. When the UC 28 receives either a PUPD or a URUPD signal, it generates an update signal at the output of the gate 121. The update signal causes the MAR 31 to be incremented to point to the next unused memory location in the MMU 12, and causes the contents of the VFP 26 to be loaded into the FP 32 of the SBAG 30 (see FIG. 6) to select the first valid stack frame 40. Following a delay 122, the update signal passes through an "OR" gate 123. It then causes a 3 to be loaded into the block select (BS) 33 of the SBAG 30 to select the last, miscellaneous block 45 of the first valid stack frame, and causes a 7 to be loaded into the word select (WS) 34 of the SBAG 30 to select the last word of that block 45. The address thus generated, (see FIG. 6) points to the count 57 which is stored in the last word 46 of the miscellaneous block 45 of the first valid frame 40. Following a delay 124, the update signal causes this address to be used in reading the count 57 from the SB 16 into a count register (CR) 35 of the SBAG 30. This the update signal accomplishes by passing to the arbiter 22 as URR control signal to move the count 57 from the SB 16 onto the data bus 14 and therefrom into the CR 35. Following another delay 125 the update signal causes a 0 to be loaded into both the BS 33 and the WS 34; then it passes through yet another delay 26, through an "OR" gate 127, and to inputs of "AND" gates 128 and 131.

The zero contents of the BS 33 cause a multiplexer 194 of SBAG 30 to select the count 58 of the first, argument, block 42 of the frame 40 whose count 58 is in the CR 35, for comparison with the contents of the WS 34, which at this point is equal to zero.

If the count 58 is greater than WS 34, that is, if there is a non-zero number of arguments, the SBAG 30 enables a second input of the "AND" gate 128, enabling the update signal to pass therethrough. The update signal passes as a URR control signal to the arbiter to cause the word addressed by the concatenated contents of the FP 32, the BS 33, and the WS 34 from the SB 16 to be read onto the data bus 14. At the same time the update signal causes the contents of the MAR 31 to be output on the address bus 15, and causes the word on the data bus 14 to be saved in the location of the MMU 12 addressed by the address bus 15. Following a delay 129, the update signal causes both the WS 34 and the MAR 31 to be incremented. The update signal then passes through another delay 130 to a second input of the "OR" gate 127 and through that gate back to the inputs of the "AND" gates 128 and 131.

The SBAG 30 again compares the count 58 of the arguments block 42 against the contents of the WS 34, which at this point is equal to 1.

If the count 58 is greater than the WS 34, that is, if there is more than one argument, the SBAG 30 again enables the second input of the "AND" gate 128 and the above process is repeated. Repetition continues until the count 58 of the arguments block is equal to the WS 34.

When the count 58 does equal the WS 34, signifying that the UC 28 has finished updating all arguments of the frame 40 into the MMU 12, the SBAG 30 enables the second input of the "AND" gate 131, allowing the update signal to pass therethrough. The update signal now causes the BS 33 to be incremented, to select the count 58 of local variables from the CR 35 and to point the BS 33 to the local variables block 43 of the frame 40 which is being updated from the SB 16. The update signal also causes the WS 34 to be reset to zero, to point to the first word of the local variables block 43.

After a delay 132 the update signal passes to the inputs of two "AND" gates 133 and 134. The other inputs of the gates 133 and 134 are a function of the contents of the BS 33, one indicating that the BS 33 contains a 0 and the other indicating that the BS has a non-zero contents. The non-zero contents signal indicates that the whole frame has not yet been updated into the MMU 12, and enables the gate 133, allowing the update signal to return to the third input of the "OR" gate 127 and therethrough to pass again to the "AND" gates 128 and 131.

Again the SBAG 30 compares the count 58, this time of the local variables block 43, against the contents of the WS 34, which is now again a 0, and the above-described process continues until all the local variables are saved, as was the case with the arguments. The contents of the BS 33 are then incremented and the update process moves on to the general registers block 44, and thereafter to the miscellaneous block 45.

Finally after the miscellaneous block 45 information is saved, the BS 33 is again incremented. However, this last, fourth incrementation resets the contents of the two bit BS 33 back to 0. This condition is detected in the SBAG 30 and in response the gate 134, as opposed to the gate 133, is enabled.

As was mentioned previously, the count 58 of the miscellaneous block 45 does not include the word 46 occupied by the frame count 57. Therefore, after the update signal has passed through the gate 134, it enables a tri-state driver 203 to output the contents of the CR 35 onto the data bus 14 and the contents of the MAR 31 to be output onto the address bus 15 to save the frame count 57 in the MMU 12, along with the rest of the information from the frame 40 that was just updated.

The update signal then causes the FP 32 to be incremented, to point to to the next frame 40 to be updated. The update signal passes through a delay 135 to the inputs of "AND" gates 136 and 137.

The other input to the gate 136 is the WA signal from the URSG 27, and the other input to the gate 137 is the inverted WA signal, produced from the WA signal by the inverter 141. If the update process has been initiated on wraparound, i.e., by the URSG 27, the gate 136 is enabled and allows the update signal to pass through. The update signal loads the contents of the FP 32 into the VFP 26, and the UC 28 terminates its operation, having updated a single frame into the MMU 12.

If, on the other hand, the update process had not been initiated on wraparound, but had been initiated by the PU 11 on a context switch, the gate 137 is enabled. The update signal at the output of the gate 137 causes a comparison of the contents of the FP 32 and the NFP 18 to be made in the SBAG 30, and thereafter it passes to inputs of "AND" gates 138 and 139.

The gates 138 and 139 take as their other inputs the result of the FP 32-NFP 18 comparison. If the FP 32 is equal to the NFP 18, signifying that the whole stack 41 has been updated into the MMU 12, the gate 138 is enabled, the PUPDC signal passes to the PU 11 to inform the PU 11 that the update process has been completed, and the UC 28 terminates its operation. The PU 11 responds by saving the MAR 31 into the process control block of that interrupted process.

If the FP 32 is not equal to the NFP 18, signifying that all frames 40 of the stack 41 have not been updated into the MMU 12, the gate 139 is enabled, the passing update signal increments the MAR 31 to point to the next available location in the MMU 12, and the update signal passes through a delay 140 to a second input of the "OR" gate 123 to repeat the whole update process for the next stack frame 40. The update process is then repeated for each remaining stack frame 40, until the FP 32 equals the NFP 18, at which time the gate 138 is enabled, the PU 11 is informed by the PUPDC signal that updating has been completed and the UC 28 terminates its operation, as described above.

Figure 5:
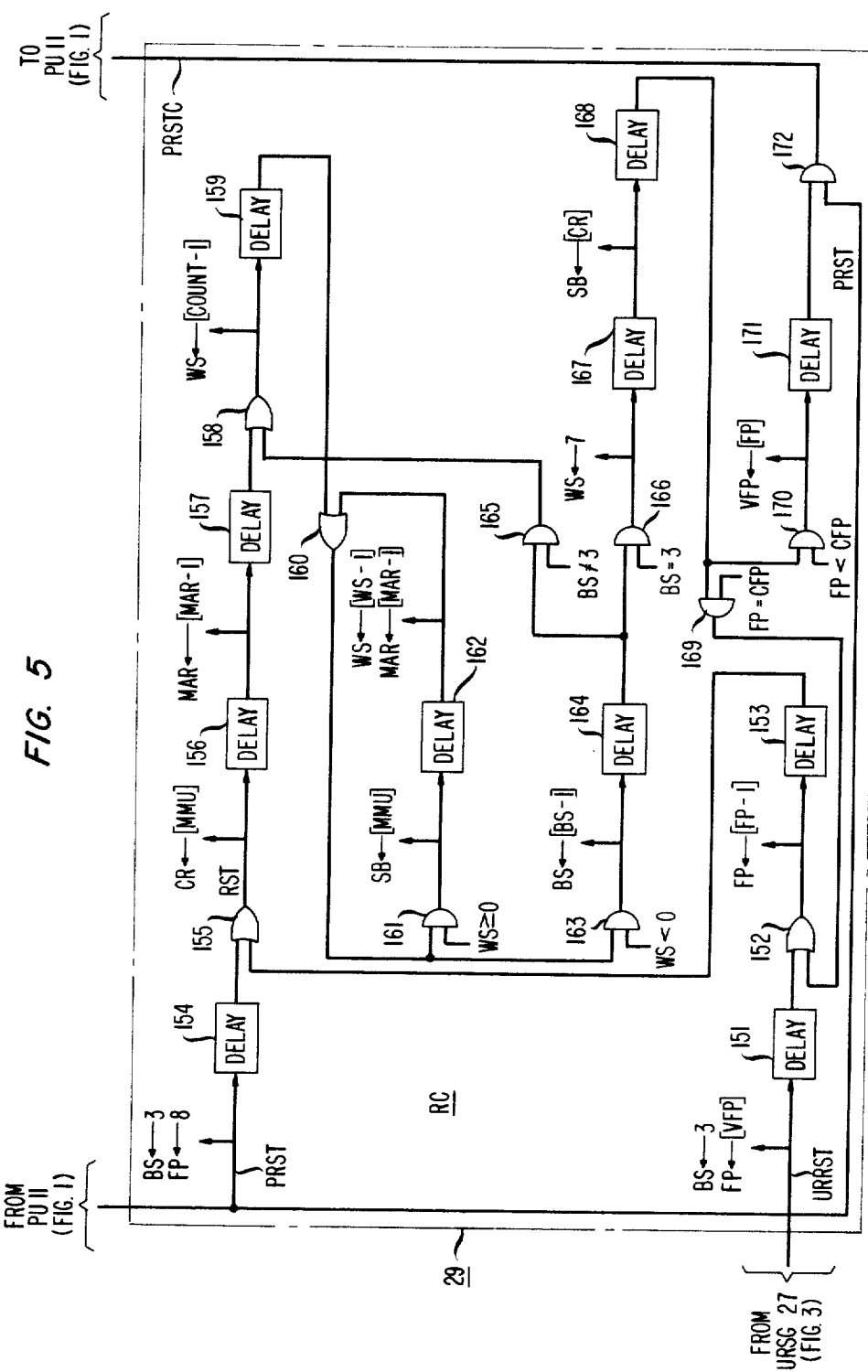
FIG. 5 is a logic diagram of the restore controller of the update and restore controller of FIG. 2.

The logical organization of the restore controlled (RC) 29 of FIG. 2 is diagramed in FIG. 5. The RC 29 restores information from the MMU 12 into the SB 16 (see FIG. 1), as described earlier. Again for the sake of clarity, all of the interconnections are not shown in FIG. 5. Rather, they are suggested in functional terms for ease of understanding by those skilled in the art.

The RC 29 functions as follows: A restore operation, involving the transfer of updated data from the MMU 12 back to the SB 16, is initiated either by the PU 11 on the occurrence of a context switch, or by the URSG 27 when the CFP 19 comes to equal the VFP 26 on a function return while the CFP 19 and the VFP 26 are on the same wrap.

Before initiating a restore operation on a context switch to a previously interrupted process, the PU 11 reloads the MAR 31 with the contents of the MAR that were stored in the process control block of that process in the MMU 12 when that process had been interrupted. Thus the MAR 31 is set to point to the area of the MMU 12 where the stack 41 of that process is saved. The PU 11 restore request also causes the RC 29 to set the middle frame 40, in this example the 8th frame 40, of the SB 16 as the first frame 40 of the stack 41 and hence the first frame 40 to be restored.

If a restore operation is requested by the URSG 27, the frame 40 to be restored is the frame 40 immediately below the first valid frame 40 pointed to by the VFP 26.

In either case, after the frame 40 in the SB 16 which is to be restored is determined, the RC 29 accesses that frame 40 and retrieves therefrom the count 57 of items of information stored in each block 42-45 of the frame 40, and according to the count 57 restores those first words 46 of each block 42-45 of the SB 16 frame 40 which are stored in the MMU 12.

When the frame 40 is restored, the RC 29 checks whether the frame 40 just restored is the frame 40 to be currently utilized, as indicated by the CFP 19. If it is, the restore operation is repeated to restore the next lower frame 40 of the stack to the SB 16. If it is not the current frame 40, the RC sets the VFP 26 to point to the just restored frame 40, and the restore process is completed.

If the restore operation was initiated by the PU 11, the RC 29 returns a PRSTC signal to the PU 11 to advise it that restoration has been completed.

To achieve this operation, the RC 29 monitors the PRST and URST signal lines from the PU 11 and the URSG 27, respectively.

A URRST signal received by the RC 29 from the URSG 27 causes a 3 to be loaded into the BS 33 of the SBAG 30, and causes the contents of the VFP 26 to be loaded into the FP 32. The restore signal passes through a delay 151 to an input of an "OR" gate 152. Following passage through the gate 152 the restore signal causes the FP 32 to be decremented, to point to the frame 40 immediately below the first valid frame 40 being pointed to by the VFP 26. The restore signal then passes through a delay 153 to an input of an "OR" gate 155.

When the RC 29 receives a PRST signal from the PU 11, the PU 11 has already retrieved the former contents of the MAR 31 from the interrupted process' control block and has loaded it into the MAR 31 to point the MAR 31 to the last location of the last frame 40 of the current process' stack 41 in the MMU 12. The restore signal from the PU 11 causes a 3 to be loaded into the BS 33 of the SBAG 30, and also causes an 8 to be loaded into the FP 32, to initialize the middle frame 40 of the SB 16 to be the first frame 40 of the SB 16 to be restored, i.e., to hold the top entry of the updated stack 41. The restore signal then passes through a delay 154 to a second input of the "OR" gate 155.

Following the gate 155, either restore signal has the same effect. The restore signal causes the contents of the MAR 31 to be output on the address bus 15, and also causes the last word of the last frame 40 of the stack in the MMU 12, which is the word pointed to by the MAR 31, to be loaded from the MMU 12 onto the data bus 14 and therefrom into the CR 35 of the SBAG 30, thereby loading the CR 35 with the count 57 of the frame 40 which is to be restored. Following a delay 150 the restore signal causes the MAR 31 to be decremented, to point to the next updated word 46 of that frame 40. The restore signal then passes through a delay 152 and through an "OR" gate 158.

The contents of the BS 33, having been initialized to 3, cause the multiplexer 194 of the SBAG 30 to select the count 58 of the last, miscellaneous, block 45 from the contents of CR 35. Presence of the restore signal at the output of the gate 158 then causes this count 58, indicative of the number of words of the miscellaneous block 45 exclusive of the count 57 itself that were saved in the MMU 12, to be decremented and the decremented count 58 to be loaded into the WS 34. The resulting address formed by concatenation of the FP 32, the BS 33, and the WS is the address in the SB 16 of the top data-containing word 46 of the miscellaneous block 45 of the frame 40 being restored.

Following a delay 159, the restore signal passes through an "OR" gate 160 to inputs of the "AND" gates 161 and 163. The other inputs of the gates 161 and 163 are results of a comparison of the contents of the WS 34 to zero. If the contents of the WS 34 are greater than or equal to zero, indicating the presence of at least one unrestored data word in the miscellaneous block 45, the gate 161 is enabled; if the contents of the WS 34 are less than zero, indicating the absence of any unrestored data words in the miscellaneous block 45, the gate 163 is enabled.

Assuming that the gate 161 is enabled, the restore signal causes the contents of the word of the MMU 12 addressed by the MAR 31 to be restored into the location of the SB 16 addressed by the concatenation of the FP 32, the BS 33, ad the WS 34. This the restore signal accomplishes by causing the contents of the MAR 31 to be output on the addresses bus 15, causing the contents of the MMU 12 word addressed thereby to be read out onto the data bus 14, and also by passing to the arbiter 22 as a URW control signal to move the word from the data bus 14 into the SB16. Following a delay 162, the restore signal causes both the WS 34 and the MAR 31 to be decremented. The restore signal is fed into a second input of the "OR" gate 160 to check again the zero/non-zero status of the WS 34. This process is continued until all data are restored to the miscellaneous block 45.

When restoration of the miscellaneous block 45 is completed, the gate 163 is enabled to allow the restore signal to pass therethrough, and the restore signal causes the BS 33 to be decremented to point to the next, the general register, block 44 of the frame 40 being restored. The restore signal then passes through a delay 164 to inputs of two "AND" gates 165 and 166.

At this point the restore signal causes the contents of the BS 33 to be compared with a 3, and the results of this comparison form second inputs to the gates 165 and 166.

As the contents of the BS 33 are not equal to 3, signifying that all blocks 42-45 of the frame 40 currently being restored have not been restored yet, the gate 165 is enabled and the restore signal is fed to a second input of the "OR" gate 158 to repeat the process, described above for the miscellaneous block 45, of restoring the general registers block 44 of the frame 40. This process is then repeated for the local variables and arguments block 43,42 as well.

Following the restoration of the arguments block 42, decrementing of the BS 33 following the gate 163 resets its contents to 3, i.e., sets both bits of the BS 33 register to 1. This indicates that all blocks 42-45 of the frame 40 currently being restored have been restored, and a signal resulting from the comparison of the contents of the BS 33 to a 3 enables the gate 166.

At the output of the gate 166 the restore signal causes a 7 to be loaded into the WS 34 to address, via the concatenation of the FP 32, the BS 33, and the WS 34, the top word 46 of the top block 45 of the just updated frame 40. Following a delay 167, the restore signal enables the tri-state gate 203 to load the contents of the CR 35 onto the data bus 14. The restore signal also passes as a URW signal to the arbiter 22 to load the CR 35 contents from the data bus 14 into the just-addressed word 46 of the SB 16, thus storing therein the count 57 of the frame 40.

The restore signal next passes through a delay 168, causes a comparison to be made between the contents of the FP 32 and the CFP 19, and enters inputs of "AND" gates 169 and 170. The results of the comparison of the FP 32 and the CFP 19 form the other inputs to the gates 169 and 170. If the FP 32 equals the CFP 19, signifying that the frame 40 just restored is the current frame 40, the gate 169 is enabled and the restore signal passes therethrough to a second input of the "OR" gate 152, to restore yet another frame 40 to the SB 16. If, however, the FP 32 is less than the CFP, signifying that a frame 40 in the stack 41 which lies above the just-restored frame 40 is being currently used and therefore further restoration is not necessary at this time, the gate 170 is enabled. The restore signal passes therethrough and causes the contents of the FP 32 to be loaded into the VFP 26 to indicate that the last-restored frame 40 is the first valid frame 40 of the stack 41 in the SB 16.

Following a delay 171, the restore signal is input to an "AND" gate 172, whose other input is the PRST. If the restore request had originated with the PU 11, the gate 172 is enabled and a PRSTC signal is returned to the PU 11 as a restore completed, PRSTC, response signal.

Figure 6:
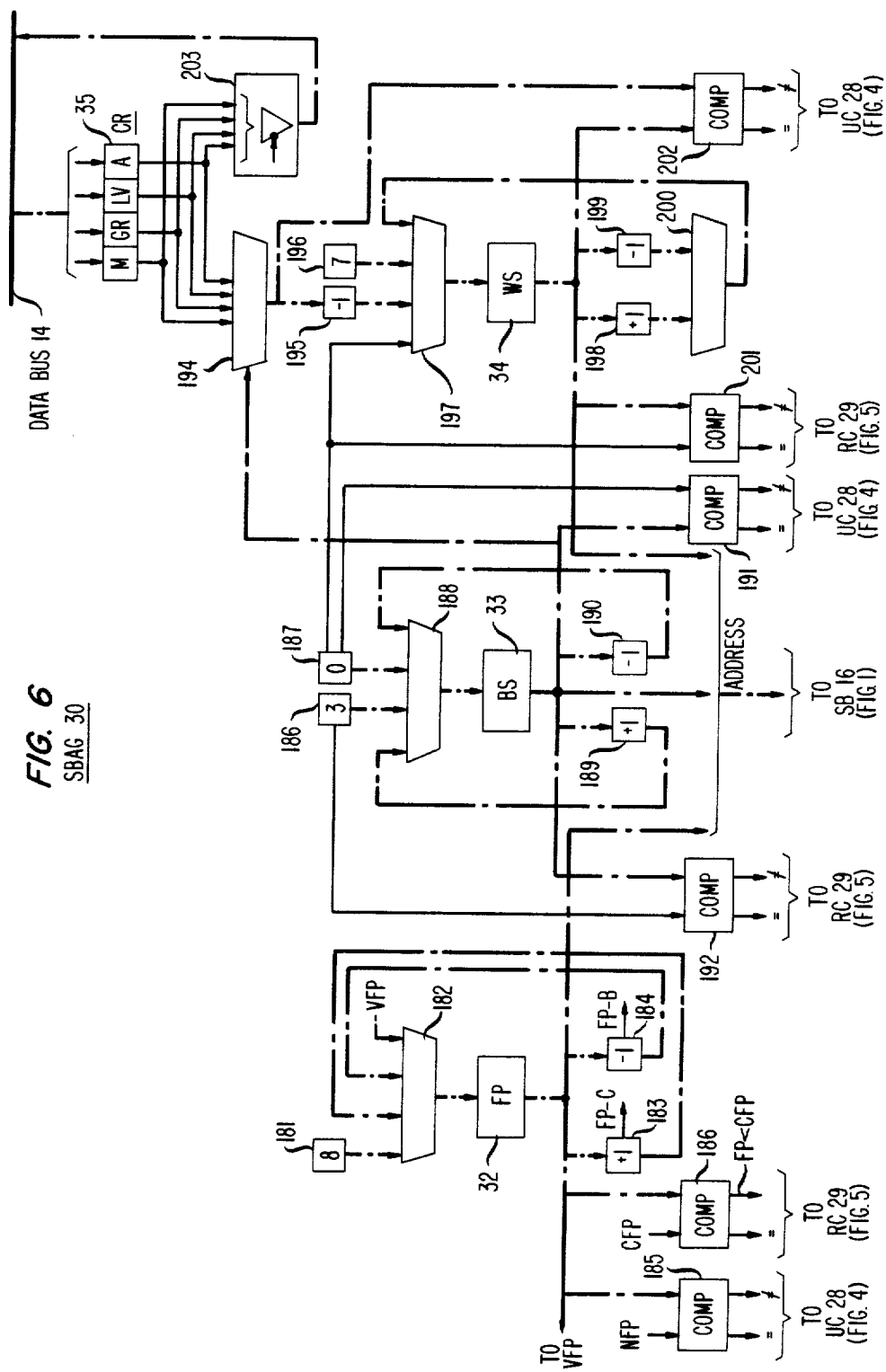
FIG. 6 is a block diagram of the stack buffer address generator of the update and restore controller of FIG. 2.

FIG. 6 shows the organization of the stack buffer address generator (SBAG) 30 of FIG. 2. As the name implies, a major function of the SBAG 30 is to generate addresses to data words 46 in the SB 16. The SBAG 30 accomplishes this function through the manipulation of the FP 32, the BS 33, and the WS 34, using the frame count 57 and the contents of the VFP 26 as data under the control of the UC 28 and the RC 29.

The operation of the SBAG 30 has substantially been described in conjunction with the description of the UC 28 and the RC 29, above, and therefore will not be restated.

Structurally, the SBAG 30 comprises four registers and their peripheral logic. The registers are the FP 32, the BS 33, and the WS 34, the concatenation of which forms addresses to the SB 16, and the CR 35 which holds the frame count 57.

The FP 32 is selectively loaded with one of four inputs: its own incremented contents, its own decremented contents, the contents of a register 181 which holds the number (8 in this example) of the frame 48 lying in the middle of the SP 16, and the contents of the VFP 26. The FP 32 is loaded through a multiplexer 182 which selects one of the inputs under the control of signals from the UC 28 and the RC 29. The FP 32 is incremented by an incrementer 183 and decremented by a decrementer 184, which two units also output the FP-C and FP-B signals utilized by the URSG 27. The FP 32 addresses the SB 16, its output forming the four most significant, frame select, bits of an SB 16 address. The contents of the FP 32 can be loaded into the VFP 26; they can also be compared with the contents of the CFP 19 by a comparator 186 and with the contents of the NFP 18 by a comparator 185. The outputs of the two comparators 185, 186 form inputs to the UC 28 and the RC 29, respectively.

The BS 33 is also selectively loaded with one of four inputs: its own incremented contents, its own decremented contents, the contents of the register 186 which holds the number (3 in this example) of the last, miscellaneous, block 45 of a frame 40, and the contents of an initializing register 187 which holds a zero. The BS 33 is incremented by an incrementer 189 and decremented by a decrementer 190. The BS 33 addresses the SB 16, its output forming the two block-specifying bits of an SB 16 address. The contents of the BS 32 can also be loaded into a comparator 191 for comparison with the contents of the initializing register 187 and into a comparator 192 for comparison with the contents of the register 186. The outputs of these two comparators 191, 192 form inputs to the UC 28 and the RC 29.

Additionally, the output of the BS 33 controls a multiplexer 194, described below.

The WS 34 is similarly selectively loaded with one of four inputs: its own offset (by 1) contents, a block count 58 (see FIG. 7) decremented by one, the contents of the initializing register 187, and the contents of a register 196 which holds the number (7 in this example) of the last word of a frame block. The WS 34 is loaded through multiplexer 197 which selects one of the inputs under the control of signals from the UC 28 and the RC 29. The WS 34 is incremented by an incrementer 198 and decremented by a decrementer 199, whose outputs are selectively provided to the WS as the offset contents input through the multiplexer 200. The multiplexer 200 is also controlled by signals from the UC 28 and the RC 29. The WS 34 addresses the SB 16, its output forming the three least significant, word-specifying, bits of an SB 16 address. The contents of the WS 34 can also be loaded into a comparator 201 for comparison with the contents of the initializing register 187, and into a comparator 202 for comparison with a block count. The outputs of these two comparators 201, 207 form inputs to the UC 28 and the RC 29.

The CR 35 is loaded with the word 46 of a frame 40 which holds the frame count 57. The loading of the CR 35 is done over the data bus 14, either from the SB 16 under the direction of the UC 28, or from the MMU 12 under the direction of the RC 29.

The individual block counts 58 of the frame count 57 are selectively retrieved from the CR 35 through a multiplexer 194 which is controlled by the BS 33. The retrieved block count 58 is decremented by the decrementer 195 to form the decremented block count input to the WS 34. The retrieved block count 58 also forms an input to a comparator 202 which compares it with the contents of the WS 34. The outputs of the comparator 202 form inputs to the UC 28 and the RC 29.

The frame count 57 is also read out of the CR 35 for storage. The readout is done by enabling the tri-state gate 203 to load the contents of the CR 35 onto the data bus 14, and therefrom to the SB 16, under the direction of the RC 29, or to the MMU 12, under the direction of the UC 28.

For storing and retrieving linkage information during function calls and returns, machine or similar level instructions to be executed by the PU 11 upon function calls and returns are generated by the compiler in response to high-level language call and return requests.

When a calling procedure i specifies a "CALL f" operation, f being the designation of the called function, the processing unit (PU) 11 (see FIG. 1) executes the following sequence of instructions that were generated by the compiler: The PU 11 first executes the instruction "MOVE COUNTi, [SBM:M$\oplus$7]". The "COUNTi" is the frame count 57 of the calling function i. SBM is the contents of the addressing mode specifier 53 (see FIG. 8), M is the contents of the block select field 51, and 7 is the contents of the word select field 52., $\oplus$ designates concatenation.

In response, the PU 11 moves the count 57 from its storage, for example in the MMU 12, to the SB 16. The SB 16 is specified by the SBM contents of the addressing mode specifier 53. In the SB 16 the PU 11 causes the count 57 to be stored in the word addressed by the concatenation of the CFP 19, the block select field 51, and the word select field 52. The CFP 19 as opposed to the NFP 18 is specified by virtue of the instruction not being a "PUSH" or a "PUSH0" instruction, discussed below. The CFP 19 points to the frame 40 of the calling function i. The block select field 51 specifies M which is the miscellaneous, in this example the top, block 45 of the calling function's frame 40, and the word select field 52 specifies 7 which is the top word 46 of the miscellaneous block 45.

If the count 58 of the argument block 42 is not zero, the PU 11 next executes the compiler-generated instruction "PUSH ARG0". In response, the PU 11 moves the first argument ARG0 of the called function i to the location in the SB 16 addressed by the concatenation of the NFP 18, the block select field 51, and the word select field 52. The NFP 18 is specified by virtue of this being a "PUSH" instruction. The NFP 18 points to the frame 40 of the called function f. The block select field 51 is 0 and specifies the argument, in this example the first, block 42; the word select field 52 is also 0 and specifies the first word 46 of the argument block 42.

If the count 58 of the argument block 42 is more than 1, the instruction "PUSH ARG0" is followed by "PUSH ARG1", which is substantially the same instruction, and results in the storing of the second argument ARG1 of the called function in the second word 46 of the argument block 42 of the frame 40 of the called function f, with the word select field 52 now being 1 and specifying the second word 46 of the block 42.

The PUSH instruction is repeated in the above manner up to "PUSH ARG(N−1)" where N is the argument block count.

If there are more than 8 arguments to be stored, overflow of the argument block 42 occurs. In such a case the compiler generates the above PUSH instructions only up to "PUSH ARG6", and replaces the instruction "PUSH ARG7" with the instruction "PUSH TOP" which causes the PU 11 to store the contents of the top of overflow pointer (TOP) 23, instead of the ARG7, in the last word 46 of the arguments block 42.

The TOP 23 is a register pointing to an area in the MMU 12 utilized for storage of block overflow, as opposed to stack overflow information which was discussed in conjunction with the UC 28 and the RC 29. The contents of the TOP 23 specify the address of the location in the MMU 12 where the next item of block overflow data is to be stored.

The "PUSH TOP" instruction is followed by a "PUSHO ARG7" instruction which causes the PU 11 to store the ARG7 in the location of the MMU 12 pointed to by the TOP 23. PUSHO next causes the PU 11 to increment the TOP 23. Hence the TOP 23 acts as a stack pointer to a block overflow stack in the MMU 12.

"PUSHO ARG7" is followed by "PUSHO ARG8" which is substantially the same instruction, and results in the storing of the ARG8 in the location of the MMU 12 pointed to by the TOP 23, which is the location immediately above the location holding the ARG7. Of course, the TOP 23 is again incremented. The PUSHO instruction is repeated in the above manner up to "PUSHO ARG(R−1)" where R is the total number of arguments of the called function.

If an argument passed to the called function is a data structure i.e., an array, rather than a single word of data, the compiler generates PUSHA or PUSHA0 instructions for that argument, instead of the PUSH or PUSHO instructions, respectively.

As before, the PU 11 is first given the instruction "MOVE COUNTi, [SBM:M⊕7]," and the PUSH instructions to store the single word arguments. When the first data structure argument is encountered, the PU 11 executes the the instruction "MOVE [TOP+(0 or R−7)], OAP", in response to which the PU 11 moves the contents of the TOP 23 incremented by the number of arguments in excess of the argument block count, i.e., the greater of either 0 or the total number of arguments, R, less seven if R is greater than 8, into the overflow array pointer (OAP) 25. The total number of arguments and their nature, i.e., single data word or data structure, is recorded by the compiler at compile time. The OAP 25 is a register pointing to an area in the MMU 12 utilized for storage of data structures. This area lies immediately above the block overflow area pointed to by the TOP 23.

Where ARGK is the Kth argument and the first data structure argument, the PU 11 next executes the instruction "PUSH ARGK." The PU 11 moves the contents of the OAP 25 into the Kth word 46 of the argument block 42 of the frame 40 of the called function. As before, this location in the SB 16 is addressed by the concatenation of the NFP 18, the block select field 51, and the word select field 52. The PU 11 next moves the first element of the data structure ARGK into the location in the MMU 12 addressed by the OAP 25, increments the OAP 25, moves the second element of ARGK into the location addressed by the OAP 25, increments the OAP 25, and so on, until all of the elements of ARGK are stored in the MMU 12.

When the second data structure argument, for example ARGQ, is encountered, the PU 11 executes the instruction "PUSHA ARGQ", which is substantially the same instruction as "PUSHA ARGK", and results in the storing of the elements of the second data structure argument ARGQ of the called function in locations of the MMU 12 directly above those locations used for the storage of the elements of ARGK. The address of the first element of ARGQ is stored in the Qth word of the argument block 42 of the called function.

The PUSHA instruction is repeated in the above manner for data structure arguments, up to "PUSHA ARG(N−1)", where N is the argument block count.

If there are more than 8 arguments to be stored, i.e., overflow of the argument block 42 occurs, the compiler generates the PUSH or PUSHA instructions only up to "PUSH ARG6" or "PUSHA ARG6" and replaces "PUSH ARG7" or "PUSHA ARG7" with the instruction "PUSH TOP" to store the contents of the TOP 23 in the last word 46 of the arguments block 42.

The "PUSH TOP" instruction is followed by a "PUSHO ARG7" if ARG7 is a single data word, or by a "PUSHA0 ARG7" instruction if ARG7 is a data structure. The "PUSHO ARG7" instruction is executed in the manner that was explained above. The "PUSHA0 ARG7" instruction causes the PU 11 store the contents of the OAP 25 in the location of the MMU 12 pointed to by the TOP 23. Like PUSHO, PUSHA0 causes the PU 11 to increment the TOP 23. The elements of ARG7 are then stored in the locations of the MMU 12 pointed to by the OAP 25, as in the case of the PUSHA instruction.

When the next data structure argument, ARGS, is encountered, the PU 11 executes the instruction "PUSHA0 ARGS", which is substantially the same instruction as "PUSHA0 ARG7", and results in the storing of the elements of ARGS in the locations pointed to by the OAP 25 and the storing of the address of the fist element of ARGS in the location pointed to by the TOP 23.

The PUSHA0 instruction is repeated in the above manner for all subsequent data structure arguments.

Following the last PUSHA0 instruction, the PU 11 is given the instruction "MOVE OAP, TOP" to set the TOP 23 to point again to the first free location of the frame overflow area of the MMU 12, which is the location immediately above the last element of the last data structure argument and which is currently pointed to by the OAP 25.

Following the instructions for the storage of the arguments of the called function f, the compiler generates the instruction "CALL f" if there are no more than 8 arguments all of which are single data words. In response, the PU 11 moves the contents of its program counter into the first location of the last, miscellaneous, block 45 of the called function's frame 40, moves the starting address of f into the program counter, and increments the contents of both the NFP 18 and CFP 19.

If the number of arguments is greater than 8 or if any of the arguments are data structures, the compiler generates the instruction "CALLO f" instead of "CALL f". In response, the PU 11 performs the same tasks as for "CALL f" and in addition stores the contents of the overflow stack pointer (OSP) 24 in the location pointed to by the TOP 25, loads the contents of the TOP 25 into the OSP 24, and increments the TOP 25. Thus the register OSP 24 is set to point to the top item of the frame overflow information of the previous i.e., next-to-last, overflowed frame.

During compile time, the compiler also assigns a memory location to each local variable which is declared, in the called function f. During execution of the function f, each local variable is stored and referenced at the assigned location.

Like the arguments, the local variables are assigned locations in the curent frame 40 of the called function f, and the assignment of locations to local variables is analogous to the assignment of locations to arguments on a function call. The local variables are assigned locations in the second block 43 of the frame 40 of the function f. The first local variable is assigned the first word 46 in the local variable block 43 of the current frame 40, pointed to by the current frame pointer (CFP) 19 of FIG. 1, in the SB 16. In the operand specifier 50 format of FIG. 8, this is represented as [SBM:LV⊕0], where SBM is the contents of the addressing mode specifier 53, LV is the contents of the block select field 51, and 0 is the contents of the word select field 52. The PU 11 addresses the first local variable via the concatenation of the CFP 19, the block select field 51, and the word select field 52. The CFP 19 as opposed to the NFP 18 is specified by virtue of the PU 11 not being given a "PUSH" or a "PUSHO" instruction, discussed above, these being reserved for manipulating the arguments.

The second local variable is assigned the location [SBM:LV⊕1], which is the second word 46 in the local variable block 43 of the current frame 40 in the SB16, as represented in the notation of FIG. 8, and so on, for up to eight local variables.

If there are more than eight local variables, overflow of the local variable block 43 occurs. This condition is often treated by the compiler in a manner similar to that of the overflow of the argument block 42. The above-described assignment of locations to local variables stops with the seventh local variable, which is assigned the location [SBM:LV⊕6]. The compiler then generates an instruction "MOVE TOP, [SBM:LV⊕7]" which will cause the PU11, after it has performed the "CALL" or "CALLO" function during program execution, to store the contents of the TOP 23 in the last word 46 of the local variable block 43 of the current frame 40.

Local variables after the seventh local variable are assigned locations designated by n[SBM:LV⊕7], where n indicates the nth offset from the location pointed to by the contents of the last word 46 of the local variables block 43 of the current frame 40. Thus, the eighth local variable is assigned the location 0[SBM:LV⊕7], which is the location in the MMU 12 addressed by the last word 46 of the local variable block 43 of the current frame 40. Because n is 0, there is no offset. The ninth local variable is assigned the location 1[SBM:LV⊕7], which is the location offset by 1 from the location assigned to the eighth local variable, i.e., the location in the MMU 12 directly above the location of the eighth local variable. The tenth local variable is assigned the location 2[SBM:LV⊕7], which is the location offset by 2 from the location assigned to the eighth local variable, i.e., the location in the MMU 12 directly above the location of the ninth local variable, and so on, for the remainder of the local variables.

If a local variable is a data structure rather than a single word, locations are assigned to the local variable through indirect addressing, in a manner analogous to the case of argument data structures. For example, if the (K+1)th local variable is a data structure, the pointer to that local variable is assigned the location [SBM:LV⊕K]. Then the first element of the (K+1)th local variable is assigned the location 0[SBM:LV⊕K], which is the location in the MMU 12 addressed by the (K+1)th word 46 of the local variables block 43 of the current frame 40; the (j+1)th element of the (K+1)th local variable is assigned the location j[SBM:LV⊕K], and so on. Similarly, the (j+1)th element of the (n+1)th local variables is assignee the location j[SBM:LV⊕n]. Because the block 43 has only eight memory words 46, (K+1) and (n+1) cannot exceed 8.

The actual values of the pointers to the local variables, that is, the contents of the words 46 of the local variable block 43 of the current frame 40, are calculated by the PU11 at run time and stored in the SB16. The pointer to the jth local variable is $$[OSP] + 1 + (0 \text{ or } R-7) + \sum_{i=1}^{j-1} E_i,$$

where [OSP] is the contents of the OSP 24; (0 or R−7) is the number of local variables in excess of the local variable block count 58, i.e., the greater of either 0 or the total number of local variables, R, less seven if R is greater than 8; and $$\sum_{i=1}^{j-1} E_i$$

represents the sum of the number of elements E, of all of the local variables which are data structures and have already been declared.

If there are more than 8 local variables, the block 43 overflows. In the case of the overflowed data structure local variables, the last word 46 of the local variable block 43 of the current frame 40 becomes an indirect pointer—a pointer to the pointers—to those local variables. Thus, if the eighth local variable is a data structure, the pointer to the eight local variable is assigned the location 0[SBM:LV⊕7]; if the ninth local variable is a data structure, the pointer to the ninth local variable is assigned the location 1[SBM:LV⊕7], and so on.

General registers of the current function f are also assigned locations in the current frame 40 by the compiler, in the same manner as the local variables, but in the general register block 44 of the current frame 40. Thus the first general register is assigned the location [SBM:GR⊕0], which is the first word 46 of the general register block 44 of the current frame 40, pointed to by the CFP 19; the second general register is assigned the location [SBM:GR⊕1], and so on.

If the called function f requires more than eight general registers, the compiler generates the instruction "MOVE TOP, [SBM:GR⊕7]," thus storing the pointer, TOP, to the eighth and subsequent registers in the last word 46 of the block 44 of the current frame 40. The eighth general register is assigned the location 0[SBM:GR⊕7], which is the location in the MMU 12 pointed to by the last word 46 of the block 44 of the current frame 40; the ninth general register is assigned the location 1[SBM:GR⊕7], which is the location in the MMU 12 immediately above the location assigned to the eighth register, and so on.

The called function f is executed by the PU 11. The PU 11 utilizes the arguments stored in or pointed to by the words 46 of the argument block 42 of the current frame 40 to execute the called function. The PU 11 utilizes the general register block 44 of the current frame in substantially the same manner as it would utilize the general registers of a conventional system. However, the PU 11 is not limited to a fixed number of general registers, as in conventional systems, because the general registers block 44 can extend, overflow, into the MMU 12. The PU 11 also utilizes the local variable and miscellaneous blocks 43 and 45, respectively, substantially as in a conventional system.

Upon a return, from a called function f having no block overflow, to a calling function i, the PU 11 is given a "RETURN" instruction. In response, the PU 11 decrements both the NFP 18 and the CFP 19.

If the return is from a called function f having block overflow, the PU 11 is given a "RETURNO" instruction. In response, the PU 11 also decrements both the NFP 18 and the CFP 19. In addition, the PU 11 moves the MMU 12 address held by the MMU 12 location pointed to by the OSP 24 into the OSP 24 to reset the OSP 24 to point to the top overflow item of the preceding overflowed frame. Furthermore, the PU 11 moves the new contents of the OSP 24 into the TOP 23 and increments the TOP 23.

If the called function f which is returning control to its calling function i is also returning a value to the calling function i, the PU 11 is given a "RETURN VAL" or a "RETURNO VAL" instruction instead of the RETURN or the RETURNO instruction, respectively. The function f can return any word 46 of its frame 40 to the calling function i. The "RETURN VAL" and "RETURNO VAL" instructions result in the same operations as the RETURN or RETURNO instructions but are followed by the additional movement by the PU 11 of the word 46 of the frame 40 pointed to by the NFP 18 which is being returned as a value into the third word of the miscellaneous block 45 of the frame 40 pointed to by the CFP 19.

The execution of the calling function i resumes at this point.

When a context switch occurs, the conventional activities associated with a context switch are performed, and in addition the PU 11 issues a PUPD command to the SCBU 13. In response, the stack 41 of the process being switched out is updated in the MMU 12. When the update is completed and the PU 11 has received the PUPDC signal from the SCBU 13, the PU 11 saves the contents of the MAR 31 in a location assigned thereto within the process control block of the process that is being switched out. The PU 11 then reloads the MAR 31 with the contents of the location assigned to the MAR 31 within the process control block of the process that is being switched to, and issues a PRST command to the SCBU 13. In response, the stack 41 of the new process is initialized—restored from the MMU 12—and the PU 11 is informed of the completion of stack initialization by the signal PRSTC. This completes the stack-related part of the context switch activities.

The fixed size stack frame scheme described above is compatible with implementation of block-structured languages, like ALGOL and PL1 for example, through the use of the conventional schemes of "static links" or "display pointers".

The static link is a pointer to the last preceding frame of that procedure which physically surrounds the current function in the written program. Static links are implemented in the fixed size stack frame scheme by allocating a predetermined location in the miscellaneous block 45 of the current frame 40 for storing the static link, in the same manner as other locations of that block are allocated and used to store the return value, the program counter, and the process status word.

The display is an array of pointers to the topmost, currently accessible, frames of those functions which statically surround the presently active function. Display pointers are implemented in the fixed size stack frame in the same manner as in a conventional stack.

In addition to the advantages enumerated in the summary, other advantages of the above-described implementation include:

1. Instructions which move arguments or local variables into registers are eliminated, thereby not only economizing on code space but also improving system efficiency by eliminating the need to fetch, decode, and execute these move instructions.

2. Instructions which move information from one stack location to another have the speed of register-to-register move instructions of a conventional machine.

3. In a programming language such as C, where a programmer must declare a local variable to be a register variable to indicate to the computer that the local variable is to be assigned storage in a register during the activation of the function, in order to allow that local variable to enjoy the same access speed as the registers, the programmer is freed from such concerns by the use of the above-described invention.

4. Since the offset from the argument block pointer and the local variables block pointer is limited to eight, the bit encoding of the arguments and local variables addressing mode requires few address bits, and a more compact code may be obtained. Only in the infrequent cases of the overflow of local variables and arguments is a longer bit encoding required. Furthermore, a more compact code translates into increased efficiency, as fewer bits have to be fetched from the store.

5. As stack buffering with fixed size stack frame matches program modularity, structured programming is now encouraged, not only because it is more manageable and flexible, but because it now runs more efficiently.

Of course, it should be understood that various changes and modifications to the illustrative embodiment described above will be apparent to those skilled in the art. Such changes and modifications can be made without departing from the spirit and the scope of the invention, and without diminishing its attendant advantages. It is therefore intended that all such changes and modifications be covered by the following claims.

What is claimed is:

1. In an improved programmable system including processor means for executing a program having a plurality of subprograms, and cache memory means for storing information linking successive subprograms, the cache memory means organized as a stack for communicating with the processor means, the improvement comprising:

a plurality of frames of equal size included in the cache memory means, each frame for storing at least some linking information linking a subprogram to the preceding subprogram;

a plurality of general register sets included in the cache memory means, each frame including one set of general registers; and means coupled to the cache memory means for storing linking information that is frame overflow information.

2. The system of claim 1 wherein each frame is for storing information linking an interruption of execution of a subprogram to a return to execution of the subprogram.

3. The system of claim 1 or 2 wherein each frame comprises a plurality of blocks of memory locations.

4. The system of claim 3 wherein the linking information comprises local variable information, argument information, general register contents, and miscellaneous information, and wherein a first block stores at least some of the argument information, a second block stores at least some of the local variable information, a third block implements at least some of the general registers, and a fourth block stores at least some of the miscellaneous information.

5. The system of claim 4 wherein each frame is associated with one subprogram.

6. The system of claim 5 wherein the general register contents pertain to the subprogram associated with the frame.

7. The system of claim 3 wherein each frame comprises four blocks of memory locations.

8. The system of claim 3 wherein the blocks are of equal size.

9. The system of claim 3 wherein each block comprises a plurality of memory locations and wherein the system further comprises means for addressing a selected location of a frame, including frame selection means for providing the address of a selected frame, frame block selection means for providing the address of a selected block of a frame, block location selection means for providing the address of a selected location of a block, and means for concatenating the addresses provided by the frame selection means, the block selection means, and the location selection means.

10. The system of claim 3 wherein one block of each frame includes a set of general registers.

11. The system of claim 3 wherein the means for storing linking information that is frame overflow information comprise means for storing linking information that is block overflow information.

12. The system of claim 1 further comprising
second memory means for storing linking information that is stack overflow information, and for communicating with the cache memory means, and wherein
the cache memory means are further organized as a buffer for communicating with the second memory means.

13. The system of claim 12 further including means for updating into the second memory means information stored in the cache memory means and means for restoring to the cache memory means information stored in the second memory means.

14. The system of claim 13 wherein the updating means comprise means for updating to the second memory means frames of information from the bottom of the stack of the cache memory means.

15. The system of claim 13 wherein the restoring means comprise means for restoring frames of information from the second memory means to the bottom of the stack of the cache memory means.

16. The system of claim 13 wherein the updating means and the restoring means operate asynchronously with respect to the operation of the processor means and while the processor means are not communicating with the cache memory means.

17. The system of claim 12 wherein the cache memory means and the second memory means communicate with each other asynchronously with respect to operation of the processor means and while the processor means are not communicating with the cache memory means.

18. The system of claim 12 further comprising means for wrapping the stack of the cache memory means around the cache memory means.

19. The system of claim 1 wherein the means for storing linking information that is frame overflow information comprise:
memory means for holding the linking information that is frame overflow information; and
pointer means located in the overflowed frame for pointing to the linking information that is frame overflow information of the overflowed frame in the memory means.

20. The system of claim 19 comprising main memory means for communicating with the processor means and cache memory means, wherein the memory means for holding frame overflow information comprise a portion of the main memory means.

21. The system of claim 1 wherein each frame is associated with one subprogram.

22. The system of claim 1 wherein each frame comprises a plurality of memory locations, and wherein the system further comprises means for addressing a selected frame location, including frame selection means for providing the address of a selected frame, frame location selection means for providing the address of a selected location of a frame, and means for concatenating the addresses provided by the frame selection means and the location selection means.

23. The system claim 1 wherein the means for storing linking information that is frame overflow information comprise:
second memory means;
means for transferring the linking information that is frame overflow information to the second memory means;
pointer means adapted to point to the linking information that is frame overflow information of a frame in the second memory means; and
means for storing the frame's pointer means in the frame.

24. The system of claim 1 wherein the means for storing linking information that is frame overflow information comprise means for storing linking information that is a data structure.

25. In an improved programmable system including processor means for executing a program having a plurality of subprograms, and cache memory means comprising a plurality of memory locations for storing linking information linking successive subprograms, the cache memory means organized as a stack for communicating with the processor means, the improvement comprising:
a plurality of frames of equal size included in the cache memory means, each frame for storing linking information linking a subprogram to the preceding subprogram;
a plurality of general register sets included in the cache memory means, each frame including one set of general registers, each frame comprising a plurality of the memory locations of the cache memory means;

second memory means for storing linking information, and for communicating with the cache memory means, the cache memory means organized as a buffer for communicating with the second memory means;

means for updating into the second memory means information stored in the cache memory means and means for restoring to the cache memory means information stored in the second memory means; and means for identifying those memory locations which are occupied by information and for causing the updating means and the restoring means to update and restore, respectively, only the memory locations which are identified as occupied by information.

26. The system of claim 25 wherein each frame comprises a plurality of blocks and each block comprises a plurality of the memory locations of the frame, and wherein the means for identifying comprise means for identifying those memory locations of each block which are occupied by information and for causing the updating means and the restoring means to update and restore, respectively, the content of only the memory locations which are identified as occupied by information.

27. The system of claim 26 wherein the identifying means comprise a count associated with each frame of the memory locations of each block in the associated frame that are occupied by information.

28. The system of claim 27 wherein the count is stored in the associated frame.

29. The system of claim 25 wherein the identifying means comprise a count associated with each frame of the memory locations in the associated frame that are occupied by information.

30. The system of claim 29 wherein the count is stored in the associated frame.

31. In an improved programmable system including processor means for executing a program having a plurality of subprograms, and a cache memory comprising a plurality of memory locations for storing information linking successive subprograms, the cache memory organized as a stack for communicating with the processor means, the improvement comprising:

a plurality of frames of equal size included in the cache memory, each frame for storing at least some linking information linking a subprogram to the preceding subprogram, each frame comprising a plurality of blocks of an equal number of cache memory locations, each block for storing a type of linkage information;

a plurality of general register sets included in the cache memory, a block of each frame including one set of general registers; and means coupled to the cache memory means for storing linking information that is block overflow information.

32. The system of claim 31 further comprising:

a second memory for storing information that is stack overflow information and for communicating with the cache memory; and the cache memory further organized as a buffer for communicating with the second memory.

33. The system of claim 32 wherein the cache memory and the second memory communicate with each other asynchronously with respect to operation of the processor means and while the processor means are not communicating with the cache memory.

34. The system of claim 33 including means for updating into the second memory information stored in the cache memory and means for restoring to the cache memory information stored in the second memory.

35. The system of claim 31 wherein the means for storing linking information that is block overflow information comprise:

a second memory;

means for transferring the linking information that is block overflow information to the second memory;

pointer means adapted to point to the linking information that is block overflow information of a block in the second memory; and means for storing the block's pointer means in the block.

36. The system of claim 31 wherein the means for storing linking information that is block overflow information comprise:

memory means for holding the linking information that is block overflow information; and pointer means located in the overflowed block for pointing to the linking information that is block overflow information of the overflowed block in the memory means.

37. The system of claim 31 further comprising:

means for addressing a selected memory location of a frame, including frame selection means for providing the address of a selected frame, frame block selection means for providing the address of a selected block of a frame, block memory location selection means for providing the address of a selected memory location of a block, and means for concatenating the addresses provided by the frame selection means, the block selection means, and the location selection means.

38. In an improved programmable system including processor means for executing a program having a plurality of subprograms, and cache memory means for storing information linking successive subprograms, the cache memory means organized as a stack for communicating with the processor means, the improvement comprising:

a plurality of frames of equal size included in the cache memory means, each frame for storing linking information linking a subprogram to the preceding subprogram;

a plurality of general register sets included in the cache memory means, each frame including one set of general registers;

second memory means for storing linking information and for communicating with the cache memory means, the cache memory means organized as a buffer for communicating with the second memory means;

means for updating into the second memory means information stored in the cache memory means and means for restoring to the cache memory means information stored in the second memory means; and means for anticipating a need to update and restore stack cache memory means information and for causing the updating means and the restoring means to respond thereto.

* * * * *

UNITED STATES PATENT AND TRADEMARK OFFICE
CERTIFICATE OF CORRECTION

PATENT NO. : 4,530,049

DATED : July 16, 1985

INVENTOR(S) : Benjamin Zee

It is certified that error appears in the above-identified patent and that said Letters Patent is hereby corrected as shown below:

```
Column 4, line 39, after "to" delete the hyphen
Column 6, line 4, after "usually" delete "either" and
   substitute therefor --eight--
Column 7, line 62, after "and" delete "controls" and
   substitute therefor --control--
Column 11, line 15, after "26" insert a comma
Column 14, line 8, delete "controlled" and substitute
   therefor --controller--
Column 17, line 11, after "frame" delete "48" and substitute
   therefor --40--
Column 17, line 51, after "through" insert --a--
Column 20, line 40, delete "fist" and substitute therefor --first--

Column 25, line 21, delete "register" and substitute
   therefor --registers--
```

Signed and Sealed this

Fourteenth Day of July, 1992

*Attest:*

DOUGLAS B. COMER

*Attesting Officer*      *Acting Commissioner of Patents and Trademarks*